US009290662B2

(12) United States Patent
Matsumoto et al.

(10) Patent No.: US 9,290,662 B2
(45) Date of Patent: Mar. 22, 2016

(54) METHOD FOR PRODUCING THERMOPLASTIC RESIN COMPOSITION, THERMOPLASTIC RESIN COMPOSITION, AND MOLDED ARTICLE

(75) Inventors: Hideki Matsumoto, Nagoya (JP); Kei Saito, Nagoya (JP); Naoya Nakamura, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 166 days.

(21) Appl. No.: 13/819,202

(22) PCT Filed: Oct. 18, 2011

(86) PCT No.: PCT/JP2011/073907
§ 371 (c)(1),
(2), (4) Date: Feb. 26, 2013

(87) PCT Pub. No.: WO2012/053505
PCT Pub. Date: Apr. 26, 2012

(65) Prior Publication Data
US 2013/0196104 A1    Aug. 1, 2013

(30) Foreign Application Priority Data

Oct. 20, 2010 (JP) ................................. 2010-235166

(51) Int. Cl.
*C08L 81/04* (2006.01)
*C08L 79/08* (2006.01)
(Continued)

(52) U.S. Cl.
CPC .................. *C08L 81/04* (2013.01); *C08L 79/08* (2013.01); *C08L 81/06* (2013.01); *C08K 5/54* (2013.01); *Y10T 428/139* (2015.01); *Y10T 428/1397* (2015.01)

(58) Field of Classification Search
CPC ......... C08L 81/04; C08L 81/06; C08L 79/08; Y10T 428/1352; Y10T 428/139; Y10T 428/1397
USPC ..................................... 428/36.9, 36.92, 35.7
See application file for complete search history.

(56) References Cited

U.S. PATENT DOCUMENTS 8,221,862 B2 *   7/2012   Saitoh et al. ............... 428/36.92
2004/0266957 A1  12/2004  Kobayashi et al.
(Continued)

FOREIGN PATENT DOCUMENTS

JP      4-130158 A      5/1992
JP      5-86293 A       4/1993
(Continued)

OTHER PUBLICATIONS

International Search Report for PCT/JP2011/073907 dated Nov. 29, 2011.

*Primary Examiner* — Walter B Aughenbaugh
(74) *Attorney, Agent, or Firm* — Birch, Stewart, Kolasch & Birch, LLP

(57) ABSTRACT

The present invention provides a thermoplastic resin composition which is produced by a method which includes melt-kneading: (a) a polyphenylene sulfide resin, with (b) a polyetherimide resin or a polyethersulfone resin. The thermoplastic resin composition contains 99 to 1% by weight of the component (a) and 1 to 99% by weight of the component (b) based on 100% by weight of the total amount of the component (a) and the component (b). The melt-kneading step is conducted by employing an extruder provided with an elongational flow zone which is a zone in which melt-kneading is performed while being allowed to undergo elongational flow, wherein the flow effect pressure drop is from 50 to 1,000 kg/cm$^2$ and is determined by subtracting the pressure value ($P_0$) of the molten resin in the elongational flow zone from the pressure value (P) of the molten resin before entering the elongational flow zone.

9 Claims, 3 Drawing Sheets

(51) Int. Cl.
  *C08L 81/06*    (2006.01)
  *C08K 5/54*    (2006.01)

(56) References Cited

U.S. PATENT DOCUMENTS

2007/0299219 A1   12/2007  Higashioji et al.
2009/0041968 A1*  2/2009  Saitoh et al. ............... 428/36.9
2011/0021707 A1*  1/2011  Kobayashi et al. ........... 525/190

FOREIGN PATENT DOCUMENTS

| | | |
|---|---|---|
| JP | 2003-268236 A | 9/2003 |
| JP | 2008-075034 A | 4/2008 |
| JP | 2009-242760 A | 10/2009 |
| JP | 2010-195853 A | 9/2010 |
| WO | WO 2007/108384 A1 | 9/2007 |
| WO | WO 2009/119624 A1 | 10/2009 |

* cited by examiner side view          sectional view side view          sectional view

METHOD FOR PRODUCING THERMOPLASTIC RESIN COMPOSITION, THERMOPLASTIC RESIN COMPOSITION, AND MOLDED ARTICLE

TECHNICAL FIELD

The present invention relates to a resin composition and a molded article made therefrom. Particularly, the present invention relates to a resin composition which is useful as a molded article for fluid piping.

BACKGROUND ART

A composition containing a polyarylene sulfide resin represented by a polyphenylene sulfide resin (hereinafter sometimes abbreviated to PPS) of thermoplastic resins has properties, which are suited for use as engineering plastics capable of serving as a substitute for parts composed of conventional metal, such as excellent heat resistance, chemical resistance, electrical insulation properties, moist heat resistance, and flame retardancy as well as high barrier properties against various oils or gases, and the composition is mainly used in various electronic parts, mechanical parts, and automobile parts as materials for injection molding and extrusion molding. Furthermore, a polyphenylene sulfide resin composition is applied for piping parts through which oil or hot water pass, and piping parts of a hot-water heater, through which hot water passes, or peripheral parts thereof by making use of these characteristics.

However, when a PPS resin composition is used as a material of piping parts of a hot-water heater, hot water heated to about 80° C. passes therethrough, and thus causing a problem that a molded article undergoes deformation, resulting in leak of water from the assembling portion, i.e. poor creep characteristics. Therefore, there arose a problem that product design is restricted, and the PPS resin composition cannot be used in parts, through which a large amount of hot water passes, and to which an inner pressure is applied.

In order to substitute a metal member for fluid piping, installed outdoors, for the PPS resin composition, it has recently been required to maintain excellent various characteristics in a wide ambient operating temperature range (from low temperature (about −20° C.) to high temperature (temperature based on the assumption of hot water)) and to have durability.

A PPS resin has low toughness as compared with other engineering plastics such as nylon and PBT, and a technique for mixing the PPS resin with an elastomer component is generally used so as to impart toughness in a particularly low temperature range. In contrast, mixing with the elastomer component may cause drastic deterioration of heat resistance of the PPS resin composition due to low glass transition temperature of the elastomer component per se.

Patent Literature 1 discloses a PPS resin composition including specific amorphous thermoplastic resins such as a polyetherimide (hereinafter sometimes abbreviated to PEI) resin and a polyethersulfone (hereinafter sometimes abbreviated to PES) mixed therein, together with an olefin elastomer.

Patent Literatures 2 to 5 disclose, for example, compositions including a PPS resin and a PEI resin or a PES resin mixed therein.

Patent Literature 6 discloses a melt-kneading method of a thermoplastic resin having a reactive functional group in which elongational flow field is utilized.

CITATION LIST

Patent Literature

[Patent Literature 1]
Japanese Unexamined Patent Publication (Kokai) No. 2008-75034 (Claims)
[Patent Literature 2]
Japanese Unexamined Patent Publication (Kokai) No. 4-130158 (Claims)
[Patent Literature 3]
Japanese Unexamined Patent Publication (Kokai) No. 5-86293 (Claims)
[Patent Literature 4]
Japanese Unexamined Patent Publication (Kokai) No. 2003-268236 (Claims)
[Patent Literature 5]
PCT International Publication No. WO 2007/108384 (Claims)
[Patent Literature 6]
PCT International Publication No. WO 2009/119624 (Claims)

SUMMARY OF INVENTION

Technical Problem

In order to apply a PPS resin as a member for fluid piping, it is important to improve high-temperature creep characteristics, which is one of techniques for evaluating heat-resistant durability, and excellent toughness in a wide temperature range, particularly toughness in a low temperature range.

However, mixing of the elastomer component having a glass transition temperature of room temperature (about 23° C.) or lower as disclosed in Patent Literature 1 enables an improvement in toughness in a low temperature range, as mentioned above, but causes drastic deterioration of heat-resistant durability, i.e. creep characteristics at high temperature.

A remarkable improvement in toughness at low temperature and high-temperature creep characteristics was not recognized under the conditions disclosed in Examples of Patent Literatures 2 to 5.

Patent Literature 6 merely disclosed mixing of a resin containing a rubbery polymer having a glass transition temperature of room temperature or lower, such as polyethylene.

An object of the present invention is to provide a thermoplastic resin composition which exhibits excellent toughness even under low-temperature environment and is excellent in high-temperature creep characteristics. Particularly, an object of the present invention is to provide a resin composition which is excellent in pressure-resistant characteristics under operating environment in which hot water is passed, and is suited for use as a molded article for fluid piping.

Solution to Problem

The present inventors have intensively studied so as to achieve the above objects and found that it is possible to obtain a resin composition which can achieve high toughness even at low temperature, and also has high-temperature creep characteristics enough to endure even under operating environment in which hot water is passed, by kneading a PPS resin with a PEI resin using a specific melt-kneading method, and that the above objects can be achieved, thus leading to the present invention.

That is, the present invention includes the followings.

(1) A method for producing a thermoplastic resin composition by melt-kneading:
(a) a polyphenylene sulfide resin, with
(b) a polyetherimide resin or a polyethersulfone resin, wherein the thermoplastic resin composition contains 99 to 1% by weight of the component (a) and 1 to 99% by weight of the component (b) based on 100% by weight of the total amount of the component (a) and the component (b); the melt-kneading step is the step of melt-kneading by an extruder provided with an elongational flow zone which is a zone in which melt-kneading is performed while being allowed to undergo elongational flow; and a flow effect pressure drop before and after the elongational flow zone is from 50 to 1,000 kg/cm².

(2) A thermoplastic resin composition including:
(a) a polyphenylene sulfide resin, and
(b) a polyetherimide resin or a polyethersulfone resin, wherein the thermoplastic resin composition contains 99 to 1% by weight of the component (a) and 1 to 99% by weight of the component (b) based on 100% by weight of the total amount of the component (a) and the component (b), and also satisfies the following conditions:
(i) tensile elongation, measured in accordance with ASTM-D638 under the conditions of a tension speed of 10 mm/minute and an ambient temperature of −20° C. using ASTM No. 4 dumbbell test pieces, is 15% or more; and
(ii) tensile creep strain, measured after the lapse of 100 hours from the beginning of a tensile creep test performed in accordance with ASTM-D2990 under the conditions of an ambient temperature of 80° C. and a tensile stress of 20 MPa using ASTM No. 4 dumbbell test pieces, is 2.8% or less.

(3) A molded article comprising the thermoplastic resin composition according to (2).

Advantageous Effects of Invention

According to the present invention, it is possible to obtain a thermoplastic resin composition which is extremely excellent in toughness represented by tensile elongation and exhibits sufficient toughness, even in particularly low temperature range, and is also excellent in high-temperature creep characteristics as an indicator of heat-resistant durability.

A molded article comprising the thermoplastic resin composition of the present invention is suited for use as a member for fluid piping. Particularly, the molded article is useful as a member in which an applicable temperature range is widened regardless of outdoor/indoor installation location.

DESCRIPTION OF EMBODIMENTS

Figure 1:
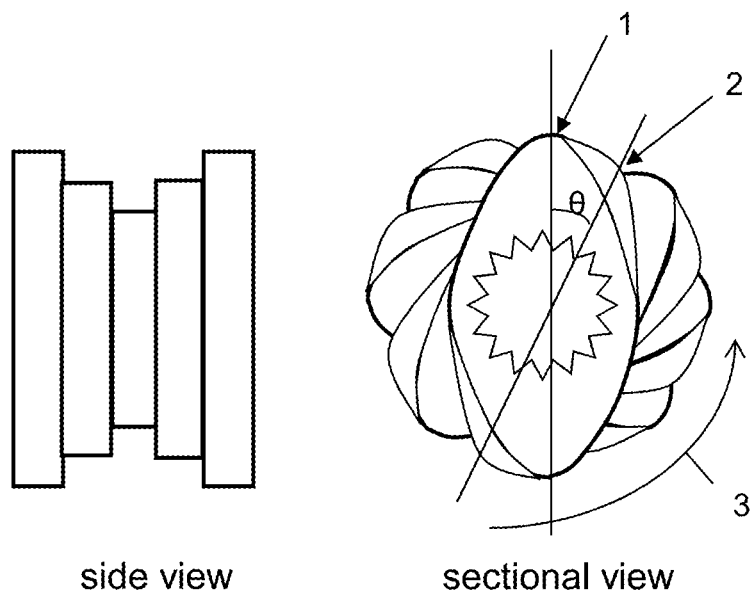
FIG. 1 shows a side view and a sectional view of a twist kneading disk used in Examples.

Embodiments of the present invention will be described in detail below.

1. (a) PPS Resin

A PPS resin (a) used in the present invention is a polymer including a repeating unit represented by the following structural formula (I).

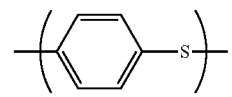

[Chemical Formula 1]

From the viewpoint of heat resistance, the polymer is preferably a polymer including 70 mol % or more, and more preferably 90 mol % or more of a repeating unit represented by the above structural formula. In the PPS resin (a), 30 mol % or less of the repeating unit may comprise a repeating unit having a structure selected from the followings.

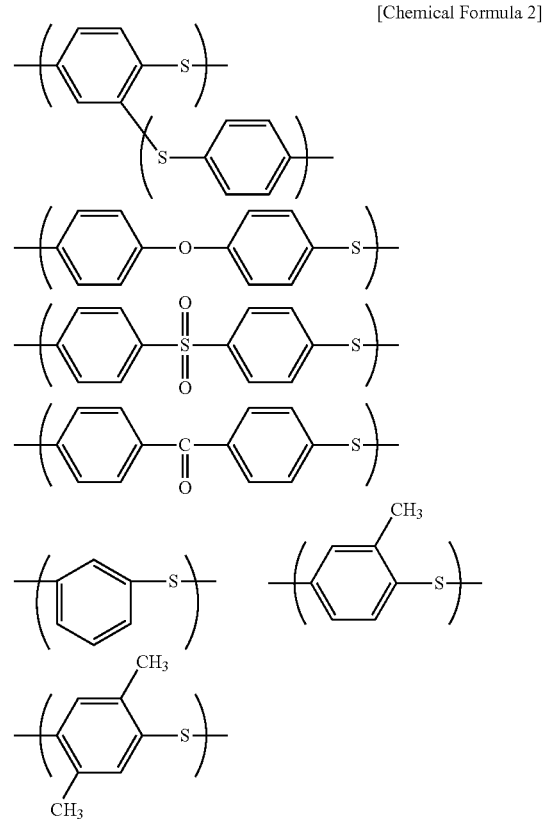

[Chemical Formula 2]

Since a melting point of the PPS copolymer including a part of these structures decreases, the obtained resin composition becomes advantageous in view of moldability.

There is no particular limitation on melt viscosity of the PPS resin (a). In order to obtain more excellent toughness, particularly low-temperature toughness enough to obtain a molded article for fluid piping, the higher the melt viscosity, the better. For example, the melt viscosity is preferably within a range of more than 80 Pa·s (at 310° C. and a shear speed of 1,000/second), more preferably 100 Pa·s or more, and still more preferably 150 Pa·s or more. In view of maintaining the melt fluidity, the upper limit is preferably 600 Pa·s or less. The melt viscosity in the present invention is the value measured under the conditions of a temperature of 310° C. and a shear speed of 1,000/second using Capilograph (orifice L/D=10 mm/1 mm).

A method for producing a PPS resin will be described below, but is not limited to the following method as long as a PPS resin having the above structure can be obtained. The PPS resin is produced by reacting a sulfidizing agent with a polyhalogenated aromatic compound in a polymerization solvent. If necessary, a molecular weight modifier, a polymerization auxiliary, and a polymerization stabilizer may also be used.

First, a polyhalogenated aromatic compound, a sulfidizing agent, a polymerization solvent, a molecular weight modifier, a polymerization auxiliary, and a polymerization stabilizer used in the production method will be described.

[Polyhalogenated Aromatic Compound]

A polyhalogenated aromatic compound refers to an aromatic compound having two or more halogen atoms in a molecule. Specific examples thereof include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene. Preferably, p-dichlorobenzene is used. It is also possible to obtain a copolymer by using two or more different polyhalogenated aromatic compounds in combination, and a p-dihalogenated aromatic compound is preferably used as a main component.

The use amount of the polyhalogenated aromatic compound is preferably within a range from 0.9 to 2.0 mol, more preferably from 0.95 to 1.5 mol, and more preferably from 1.005 to 1.2 mol, based on 1 mol of the sulfidizing agent in view of obtaining a PPS resin having a viscosity suited for processing.

[Sulfidizing Agent]

Examples of a sulfidizing agent include an alkali metal sulfide, an alkali metal hydrosulfide, and hydrogen sulfide.

Specific examples of the alkali metal sulfide include lithium sulfide, sodium sulfide, potassium sulfide, rubidium sulfide, cesium sulfide, and a mixture of two or more alkali metal sulfides. Of these, sodium sulfide is preferably used. These alkali metal sulfides can be used as a hydrate or an aqueous mixture, or used in the form of an anhydride.

Specific examples of the alkali metal hydrosulfide include sodium hydrosulfide, potassium hydrosulfide, lithium hydrosulfide, rubidium hydrosulfide, cesium hydrosulfide, and a mixture of two or more alkali metal hydrosulfides. Of these, sodium hydrosulfide is preferably used. These alkali metal hydrosulfides can be used as a hydrate or an aqueous mixture, or used in the form of an anhydride.

It is also possible to use an alkali metal sulfide which is prepared from an alkali metal hydrosulfide and an alkali metal hydroxide in a reaction system. It is also possible that an alkali metal sulfide is prepared from an alkali metal hydrosulfide and an alkali metal hydroxide, and the obtained alkali metal sulfide is used after transferring to a polymerization vessel.

Alternatively, it is also possible to use an alkali metal sulfide prepared from an alkali metal hydroxide such as lithium hydroxide or sodium hydroxide, and hydrogen sulfide in a reaction system. It is also possible that an alkali metal sulfide is prepared from an alkali metal hydroxide such as lithium hydroxide or sodium hydroxide, and hydrogen sulfide, and the obtained alkali metal sulfide is used after transferring to a polymerization vessel.

When a partial loss of a sulfidizing agent is caused by a dehydration operation before the beginning of a polymerization reaction, the charge amount of the sulfidizing agent means a residual amount in which the loss is subtracted from an actual charge amount.

It is also possible to use an alkali metal hydroxide and/or an alkali earth metal hydroxide in combination with the sulfidizing agent. Specific examples of the alkali metal hydroxide are preferably sodium hydroxide, potassium hydroxide, lithium hydroxide, rubidium hydroxide, cesium hydroxide, and a mixture of two or more alkali metal hydroxides. Specific examples of the alkali earth metal hydroxide include calcium hydroxide, strontium hydroxide, and barium hydroxide. Of these, sodium hydroxide is preferably used.

When the alkali metal hydrosulfide is used as the sulfidizing agent, it is particularly preferred to simultaneously use an alkali metal hydroxide. The use amount of the alkali metal hydroxide is preferably within a range from 0.95 to 1.20 mol, more preferably from 1.00 to 1.15 mol, and still more preferably from 1.005 to 1.100 mol, based on 1 mol of the alkali metal hydrosulfide.

[Polymerization Solvent]

It is preferred to use an organic polar solvent as a polymerization solvent. Specific examples thereof include aprotic organic solvents, for example, N-alkylpyrrolidones such as N-methyl-2-pyrrolidone and N-ethyl-2-pyrrolidone; caprolactams such as N-methyl-ϵ-caprolactam; 1,3-dimethyl-2-imidazolidinone, N,N-dimethylacetamide, N,N-dimethylformamide, hexamethylphosphoric acid triamide, dimethylsulfone, tetramethylenesulfoxide, and a mixture thereof. These solvents are preferably used because of high reaction stability reaction. Of these, N-methyl-2-pyrrolidone (hereinafter sometimes abbreviated to NMP) is preferably used.

The use amount of the organic polar solvent is preferably within a range from 2.0 mol to 10 mol, more preferably from 2.25 to 6.0 mol, and more preferably from 2.5 to 5.5 mol, based on 1 mol of the sulfidizing agent.

[Molecular Weight Modifier]

In order to form an inert end of the formed PPS resin or to adjust a polymerization reaction or a molecular weight, a monohalogen compound (which may not be necessarily an aromatic compound) can be used in combination with the above polyhalogenated aromatic compound.

[Polymerization Auxiliary]

It is also one of preferable aspects to use a polymerization auxiliary so as to obtain a PPS resin of comparatively high polymerization degree within a shorter time. As used herein, the polymerization auxiliary means a substance having an action of increasing a viscosity of the obtained PPS resin. Specific examples of the polymerization auxiliary include an organic carboxylate, water, an alkali metal chloride, an organic sulfonate, a sulfuric acid alkali metal salt, an alkali earth metal oxide, an alkali metal phosphate, and an alkali earth metal phosphate. These polymerization auxiliaries can be used alone, or two or more polymerization auxiliaries can also be simultaneously used. Of these, an organic carboxylate, water, and an alkali metal chloride are preferable. The organic carboxylate is preferably an alkali metal carboxylate, and the alkali metal chloride is preferably lithium chloride.

The alkali metal carboxylate is a compound represented by the general formula R(COOM)n (wherein R is an alkyl group, a cycloalkyl group, an aryl group, an alkylaryl group, or an arylalkyl group, each having 1 to 20 carbon atoms, M is alkali metal selected from lithium, sodium, potassium, rubidium, and cesium, and n is an integer of 1 to 3). The alkali metal carboxylate can also be used as a hydrate, an anhydride, or an aqueous solution. Specific examples of the alkali metal carboxylate include lithium acetate, sodium acetate, potassium acetate, sodium propionate, lithium valerate, sodium benzoate, sodium phenylacetate, sodium p-toluate, and a mixture thereof.

The alkali metal carboxylate may be formed by reacting an organic acid with at least one compound selected from the group consisting of an alkali metal hydroxide, an alkali metal carbonate, and an alkali metal bicarbonate added in nearly the same chemical equivalent. Of the above alkali metal carboxylates, a lithium salt has high solubility in the reaction system and exerts a large auxiliary effect but is expensive, while potassium, rubidium and cesium salts have insufficient solubility in the reaction system. Therefore, sodium acetate, which is inexpensive and has appropriate solubility in a polymerization system, is used most preferably.

When these alkali metal carboxylates are used as the polymerization auxiliary, the use amount is preferably within a range from 0.01 mol to 2 mol, based on 1 mol of the sulfidizing agent. In order to obtain high polymerization degree, the amount is more preferably within a range from 0.1 to 0.6 mol, and still more preferably from 0.2 to 0.5 mol.

When water is used as the polymerization auxiliary, the addition amount is preferably within a range from 0.3 mol to 15 mol based on 1 mol of the sulfidizing agent. In order to obtain high polymerization degree, the amount is more preferably within a range from 0.6 to 10 mol, and still more preferably from 1 to 5 mol.

It is also possible to use two or more polymerization auxiliaries in combination. For example, when the alkali metal carboxylate is used in combination with water, it becomes possible to achieve high molecular weight in a smaller amount as compared with the case of using alone.

There is no particular limitation on timing of addition of these polymerization auxiliaries, and these polymerization auxiliaries may be added upon below-mentioned pre-step, upon beginning of polymerization, and during polymerization, and also may be added in plural portions. When the alkali metal carboxylate is used as the polymerization auxiliary, the alkali metal carboxylate is more preferably added upon the beginning of the pre-step or polymerization, simultaneously, in view of ease of addition. When water is used as the polymerization auxiliary, it is effective to add during the polymerization reaction after charging a polyhalogenated aromatic compound.

[Polymerization Stabilizer]

In order to prevent side reaction by stabilizing the polymerization reaction system, a polymerization stabilizer can also be used. The polymerization stabilizer contributes to stabilization of the polymerization reaction system and suppresses undesirable side reaction. A sign of the side reaction includes formation of thiophenol and formation of thiophenol can be suppressed by the addition of a polymerization stabilizer. Specific examples of the polymerization stabilizer include compounds such as an alkali metal hydroxide, an alkali metal carbonate, an alkali earth metal hydroxide, and an alkali earth metal carbonate. Of these, alkali metal hydroxides such as sodium hydroxide, potassium hydroxide, and lithium hydroxide are preferable. The above alkali metal carboxylate also acts as the polymerization stabilizer and is therefore included in one of the polymerization stabilizers. While a mentioned was made of the fact that it is particularly preferred to simultaneously use the alkali metal hydroxide when the alkali metal hydrosulfide is used as the sulfidizing agent, the alkali metal hydroxide, which becomes excessive for the sulfidizing agent, can serve as the polymerization stabilizer.

These polymerization stabilizers can be used alone, or two or more polymerization stabilizers can be used in combination. The polymerization stabilizer is preferably used in the amount within a range from 0.02 to 0.2 mol, more preferably from 0.03 to 0.1 mol, and still more preferably from 0.04 to 0.09 mol, based on 1 mol of the sulfidizing agent. When the amount is less than the above range, insufficient stabilization effect may be exerted. In contrast, excessively large amount may cause economic disadvantage, resulting in decreased polymer yield.

There is no particular limitation on addition timing of the polymerization stabilizer, and the polymerization stabilizer may be added upon below-mentioned pre-step, upon beginning of polymerization, and during polymerization, and also may be added in plural portions. It is more preferred to add upon beginning of the pre-step and upon beginning of polymerization in view of ease of addition.

Preferred method for producing a PPS resin will be described below sequentially in the order of a pre-step, a polymerization reaction step, a recovery step, and a post-treatment step, but is not limited thereto.

[Pre-Step]

In a method for producing a PPS resin, a sulfidizing agent is usually used in the form of a hydrate. Before the addition of a polyhalogenated aromatic compound, a mixture containing a polymerization solvent and a sulfidizing agent is preferably heated to remove an excess amount of water out of the system.

As mentioned above, it is also possible to use, as the sulfidizing agent, a sulfidizing agent prepared from an alkali metal hydrosulfide and an alkali metal hydroxide in the reaction system, or in a vessel other than a polymerization vessel. Examples of this method include, but are not limited to, a method in which an alkali metal hydrosulfide and an alkali metal hydroxide are preferably added to a polymerization solvent under an inert gas atmosphere at a temperature within a range from a normal temperature to 150° C., and preferably from a normal temperature to 100° C., and then moisture is distilled off by heating to at least 150° C. or higher, and preferably from 180 to 260° C., under normal pressure or reduced pressure. At this stage, a polymerization auxiliary may be added. In order to accelerate distillation of moisture, the reaction may be performed by adding toluene.

In the polymerization reaction, the amount of moisture in the polymerization system is preferably from 0.3 to 10.0 mol based on 1 mol of the charged sulfidizing agent. As used herein, the amount of moisture in the polymerization system is the amount obtained by subtracting the amount of moisture removed out of the polymerization system from the amount of moisture charged in the polymerization system. Water to be charged may be in any form such as water, aqueous solution, or crystallization water.

[Polymerization Reaction Step]

A PPS resin is prepared by reacting a sulfidizing agent with a polyhalogenated aromatic compound in a polymerization solvent at a temperature within a range of 200° C. or higher and 290° C. or lower.

In the case of the beginning of a polymerization reaction step, it is desired that a polymerization solvent, a sulfidizing agent and a polyhalogenated aromatic compound are preferably mixed under an inert gas atmosphere at a temperature within a range from a normal temperature to 240° C., and more preferably from 100 to 230° C. At this stage, a polymerization auxiliary may be added. These raw materials may be charged in random order, or simultaneously.

The mixture is preferably heated to a temperature within a range from 200° C. to 290° C. There is no particular limitation on a temperature rise rate, and a rate of 0.01 to 5° C./minute is preferably selected and the rate is more preferably within a range from 0.1 to 3° C./minute.

In general, the temperature is finally raised to a temperature within a range from 250 to 290° C., and the reaction is preferably performed at the same temperature for 0.25 to 50 hours, and more preferably 0.5 to 20 hours.

It is an effective method to raise the temperature to a temperature within a range from 270 to 290° C. after reacting at 200° C. to 260° C. for given hours at the stage before reaching a final temperature, so as to obtain higher polymerization degree. In this case, the selected reaction time at 200° C. to 260° C. is preferably within a range from 0.25 hours to 20 hours, and more preferably from 0.25 to 10 hours.

In order to obtain a polymer with higher polymerization degree, it is sometimes effective to polymerize in a plurality of stages. It is effective that the polymerization is performed in the plurality of stages when a conversion ratio of the polyhalogenated aromatic compound in the system at 245° C. has preferably reached 40 mol % or more, and more preferably 60 mol %.

The conversion ratio of the polyhalogenated aromatic compound (herein abbreviated to PHA) is the value calculated by the equations shown below. The residual amount of PHA can be usually determined by gas chromatography.

(A) When a polyhalogenated aromatic compound is added to an alkali metal sulfide in an excess molar ratio, the following equation is established:

Conversion ratio=[charge amount of PHA (mol)−residual amount of PHA (mol)]/[charge amount of PHA (mol)−excess amount of PHA (mol)].

(B) In the case other than the above (A), the following equation is established:

Conversion ratio=[charge amount of PHA (mol)−residual amount of PHA (mol)]/[charge amount of PHA (mol)].

[Recovery Step]

In the method for producing a PPS resin, a solid is recovered from the obtained polymerization reaction product containing a polymer and a polymerization solvent after completion of the polymerization. Known any recovery method may be employed to produce a PPS resin.

For example, it is possible to use a method in which a granular polymer is recovered by slow cooling after completion of the polymerization reaction. In this case, there is no particular limitation on slow cooling speed, and the speed is preferably from about 0.1° C./minute to 3° C./minute. It is not necessary to perform slow cooling at the same rate in the whole step of the slow cooling step. Until polymer particles are precipitated in the form of crystals, it is possible to employ a method in which slow cooling is performed at a rate of 0.1 to 1° C./minute, followed by cooling at a rate of 1° C./minute or more.

It is one of preferable methods to recover the polymer under rapid cooling condition. A preferable method of the recovery method includes a flushing method. The flushing method is the method in which the polymerization reaction product is flushed in an atmosphere under a normal pressure or vacuum pressure from a state of high temperature and high pressure (usually 250° C. or higher, 8 kg/cm$^2$ or more), and then the solvent is recovered and, at the same time, a polymer is recovered after forming into powders. As used herein, flushing means that the polymerization reaction product is gushed out through a nozzle. Specific examples of the flushing atmosphere include nitrogen or steam in a normal pressure, and the selected temperature is preferably within a range from 150° C. to 250° C.

[Post-Treatment Step]

A PPS resin may be subjected to an acid treatment, a hot water treatment, or washing with an organic solvent after forming by passing through the above polymerization step and recovery step.

The method of the acid treatment is as follows. There is no particular limitation on the acid to be used in the acid treatment of the PPS resin as long as it does not exert the action of decomposing the PPS resin, and examples thereof include acetic acid, hydrochloric acid, sulfuric acid, phosphoric acid, silicic acid, carbonic acid, and propyl acid. Of these, an acid selected from acetic acid and hydrochloric acid is preferably used. The acid is not preferably nitric acid which decomposes the PPS resin to caused degradation.

Examples of the method of the acid treatment include a method in which a PPS resin is immersed in an acid or an aqueous solution of an acid. It is also possible to appropriately stir or heat, if necessary. For example, when using acetic acid, sufficient effect can be obtained by immersing a PPS resin powder in an aqueous solution at pH 4 heated to a temperature within a range from 80 to 200° C., followed by stirring for 30 minutes. After the treatment, the pH of the aqueous solution may be 4 or higher, for example, about 4 to 8. The PPS resin subjected to the acid treatment is preferably washed several times with water or warm water so as to remove the residual acid or salt. Water to be used for washing is preferably distilled water or deionized water, so as not to impair the effect of chemical modification of the PPS resin by an acid treatment.

The method of a hot water treatment is as follows. When the PPS resin is subjected to a hot water treatment, the temperature of hot water is preferably 100° C. or higher, more preferably 120° C. or higher, still more preferably 150° C. or higher, and particularly preferably 170° C. or higher. The temperature of hot water of lower than 100° C. is not preferred since less effect of preferable chemical modification of the PPS resin is exerted.

In order to exert the effect of preferable chemical modification of the PPS resin by a hot water treatment, water used is preferably distilled water or deionized water. There is no particular limitation on the operation of the hot water treatment, and the hot water treatment is performed by a method in which a predetermined amount of a PPS resin is introduced into a predetermined amount of water, followed by heating and stirring in a pressure vessel, and a method in which a hot water treatment is continuously applied. The amount of water is preferably more than that of the PPS resin, and a bath ratio of water (1 liter) to the PPS resin (200 g or less) is usually selected.

The atmosphere of the treatment is preferably an inert atmosphere so as to avoid undesirable decomposition of end groups. After completion of the operation of the hot water treatment, the PPS resin is preferably washed several times with warm water so as to remove the residual component.

A method for washing with an organic solvent is as follows. There is no particular limitation on the organic solvent used for washing of the PPS resin, as long as it does not have the action of decomposing the PPS resin. Examples thereof include nitrogen-containing polar solvents such as N-methyl-2-pyrrolidone, dimethylformamide, dimethylacetamide, 1,3-dimethylimidazolidinone, hexamethylphosphorusamide, and piperazinones; sulfoxide/sulfone-based solvents such as dimethyl sulfoxide, dimethyl sulfone, and sulfolane; ketone-based solvents such as acetone, methyl ethyl ketone, diethyl ketone, and acetophenone; ether-based solvents such as dimethyl ether, dipropyl ether, dioxane, and tetrahydrofuran; halogen-based solvents such as chloroform, methylene chloride, trichloroethylene, ethylene dichloride, perchloroethylene, monochloroethane, dichloroethane, tetrachloroethane, perchloroethane, and chlorobenzene; alcohol phenol-based solvents such as methanol, ethanol, propanol, butanol, pentanol, ethylene glycol, propylene glycol, phenol, cresol, polyethylene glycol, and polypropylene glycol; and aromatic hydrocarbon-based solvents such as benzene, toluene, and xylene. Of these organic solvents, use of N-methyl-2-pyrrolidone, acetone, dimethylformamide, and chloroform is particularly preferable. These organic solvents may be used alone, or two or more organic solvents may be used in combination.

The method of washing with an organic solvent includes a method in which a PPS resin is immersed in an organic solvent. If necessary, it is also possible to appropriately stir or heat. There is no particular limitation on the temperature at which the PPS resin is washed with the organic solvent, and any temperature of about normal temperature to 300° C. can be selected. As the washing temperature becomes higher, washing efficiency may increase. Usually, sufficient effect is obtained when the washing temperature is from normal temperature to 150° C. It is also possible to wash at a temperature of a boiling point or higher of an organic solvent under pressure in a pressure vessel. There is also no particular limitation on the washing time. Although depending on the washing conditions, sufficient effect is usually obtained by washing for 5 minutes or more in the case of batchwise washing. It is also possible to wash in a continuous manner.

In the present invention, a PPS resin including an alkali earth metal salt such as a calcium salt introduced therein may be used. Examples of the method for introducing an alkali earth metal salt into a PPS resin include a method in which an alkali earth metal salt is added before a pre-step, during a pre-step, or after a pre-step; a method in which an alkali earth metal salt is added in a polymerization kettle at the stage before a polymerization step, during a polymerization step, or after a polymerization step; or a method in which an alkali earth metal salt is added at a first, middle, or final stage of the washing step. Of these, most easy method includes a method in which an alkali earth metal salt is added after removing the residual oligomer or the residual salt from a PPS resin by washing with an organic solvent or washing with hot water. The alkali earth metal salt is preferably introduced in the form of ions of alkali earth metals of acetates, hydroxides, and carbonates. It is more preferred to remove an excess alkali earth metal salt by washing with warm water. The concentration of alkali earth metal ions in the PPS resin is preferably 0.001 mmol or more, and more preferably 0.01 mmol or more, based on 1 g of the PPS resin.

It is also possible to use the PPS resin after the molecular weight is increased by a thermo-oxidative cross-linking treatment due to heating under an oxygen atmosphere and heating through the addition of a cross-linking agent such as peroxide, after completion of the polymerization.

When a dry heat treatment is performed for the purpose of increasing the molecular weight by thermo-oxidative cross-linking, the temperature is preferably within a range from 160 to 260° C., and more preferably from 170 to 250° C. The concentration of oxygen of a treatment atmosphere is preferably adjusted to 5% by volume or more, and more preferably 8% by volume or more. There is no particular limitation on the upper limit of the concentration of oxygen, and the upper limit is about 50% by volume. The treatment time is preferably from 0.5 to 100 hours, more preferably from 1 to 50 hours, and still more preferably from 2 to 25 hours. A device for heat treatment may be usually either hot air dryer, or a rotary heater or a heater equipped with a stirring blade. When a treatment is performed efficiently and more uniformly, a rotary heater or a heater equipped with a stirring blade is more preferably used.

It is possible to perform a dry heat treatment for the purpose of suppressing thermo-oxidative cross-linking and removing the volatile component. The temperature is preferably within a range from 130 to 250° C., and more preferably from 60 to 250° C. In this case, the concentration of oxygen in the atmosphere is preferably adjusted to less than 5% by volume, and more preferably less than 2% by volume. The treatment time is preferably from 0.5 to 50 hours, more preferably from 1 to 20 hours, and still more preferably from 1 to 10 hours. A device for heat treatment may be usually either hot air dryer, or a rotary heater or a heater equipped with a stirring blade. When a treatment is performed efficiently and more uniformly, a rotary heater or a heater equipped with a stirring blade is more preferably used.

In the present invention, the PPS resin (a) is preferably substantially linear PPS resin which is not allowed to undergo an increase in molecular weight by a thermo-oxidative cross-linking treatment, so as to achieve the objective toughness. Examples of preferable PPS resin (a) include M2588, M2888, M2088, T1881, L2120, L2480, M2100, M2900, E2080, E2180, and E2280 manufactured by Toray Industries, Inc.

2. (b) Polyetherimide Resin

A polyetherimide resin as used in the present invention is a polymer including an aliphatic, alicyclic, or aromatic ether unit and a cyclic imide group as a repeating unit. There is no particular limitation on the polymer as long as it is a polymer having melt moldability. As long as the effects of the present invention are not impaired, structure units other than a cyclic imide and an ether bond, for example, an ester unit and an oxycarbonyl unit may be included in a main chain of polyetherimide As a specific polyetherimide, a polymer represented by the following general formula is preferably used.

[Chemical Formula 3]

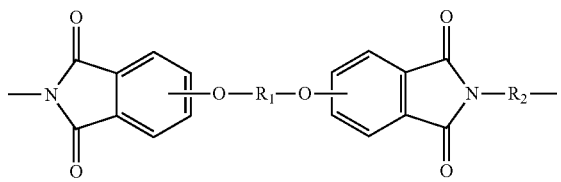

In the above formula, $R_1$ is a divalent aromatic residue having 6 to 30 carbon atoms, and $R_2$ is a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group chain-terminated by an alkylene group having 2 to 8 carbon atoms. As the above $R_1$ and $R_2$, for example, a group selected from the group of the following formulas is preferably used.

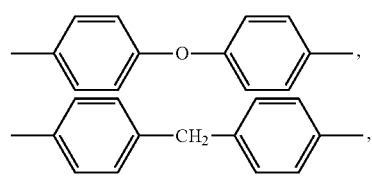

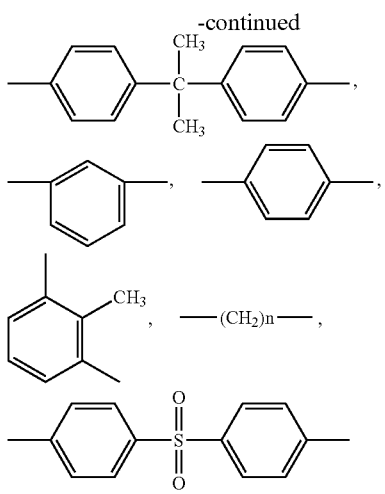

In the present invention, from the viewpoint of melt moldability and costs, a condensate of 2,2-bis[4-(2,3-dicarboxyphneoxy)phenyl]propane dianhydride including structural units represented by the formulas shown below, and m-phenylenediamine or p-phenylenediamine is preferably used. This polyetherimide is commercially available from SABIC Innovative Plastics under the trade name of series of "Ultem" (registered trademark), and is known under the trade names of "Ultem (registered trademark) 1,000", "Ultem (registered trademark) 1010", "Ultem (registered trademark) 1040", "Ultem (registered trademark) 5000", "Ultem (registered trademark) 6000", and "Ultem (registered trademark) XH6050", and "Extem (registered trademark) XH" and "Extem (registered trademark) UH".

[Chemical Formula 5]

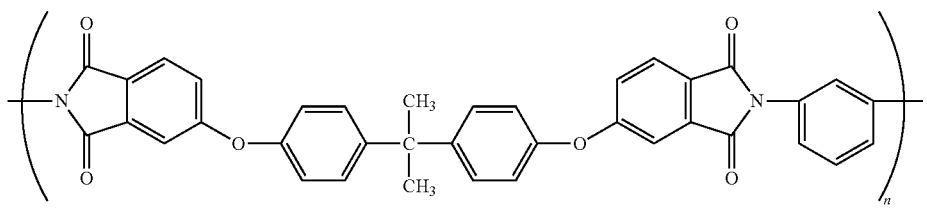

[Chemical Formula 6]

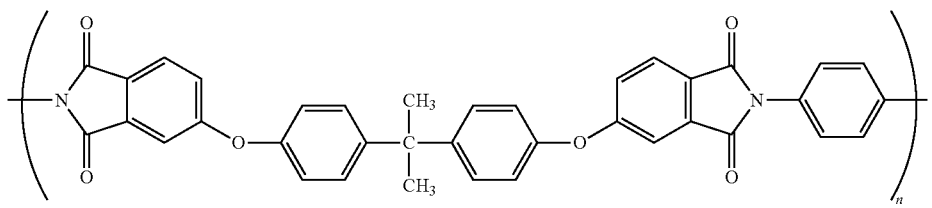

There is no particular limitation on a molecular weight of a polyetherimide resin. It is preferred to use a PEI resin having a weight average molecular weight, measured by GPC-MALLS, within a range from preferably 30,000 to 120,000, more preferably from 40,000 to 110,000, and particularly preferably from 50,000 to 100,000, since it may become possible to achieve highly fine dispersion in a PPS resin, and thus exhibiting more excellent toughness, particularly excellent toughness even at low temperature, resulting in remarkable improvement in high-temperature creep characteristics. When using a PEI resin having a weight average molecular weight of less than 30,000, the strength of the obtained molded article may decrease, and thus making it impossible to achieve highly fine dispersion in a PPS resin. When using a PEI resin having a weight average molecular weight of more than 120,000, a molded article for fluid piping produced by injection molding may be inferior in flow processability.

The weight average molecular weight as used herein means the value obtained in such a manner that a PEI resin is dissolved dimethylformamide as a solvent and a weight average molecular weight (absolute molecular weight) of the solution is measured by a gel permeation chromatograph (pump: Model 515, manufactured by Waters Corporation, column: TSK-gel-GMH$_{XL}$, manufactured by TOSOH CORPORATION) equipped with a DAWN-DSP type multi-angle laser light scattering photometer (manufactured by Wyatt Technology Corporation).

(b) Polyethersulfone Resin

A polyethersulfone resin (b) used in the present invention is collectively referred to as a resin including a skeleton in which an aromatic group is bonded by a sulfone group and an ether group. Examples thereof include polyethersulfone comprising at least one repeating unit selected from the group consisting of the following general formulas (1) to (3).

[Chemical Formula 7]

$$(-Ar^1-SO_2-Ar^2-O-) \quad (1)$$

$$(-Ar^3-X-Ar^4-O-Ar^5-SO_2-Ar^6-O-) \quad (2)$$

$$(-Ar^7-SO_2-Ar^8-O-Ar^9-O-) \quad (3)$$

In the formula (1), $Ar^1$ and $Ar^2$ represent the same or different aromatic hydrocarbon group having 6 to 12 carbon atoms. In the formula (2), $Ar^3$ to $Ar^6$ represent the same or different aromatic hydrocarbon group having 6 to 12 carbon atoms, and X is a divalent hydrocarbon group having 1 to 15 carbon atoms. In the formula (3), $Ar^7$ to $Ar^9$ represent the same or different aromatic hydrocarbon group having 6 to 12 carbon atoms.

In the formula (1), $Ar^1$ and $Ar^2$ are preferably arylene groups having 6 to 12 carbon atoms, and more preferably arylene groups having 6 to 10 carbon atoms. Specific examples thereof include a m-phenylene group, a p-phenylene group, a dimethyl-p-phenylene group, a tetramethyl-p-phenylene group, a naphthylene group, and a biphenylene group. It is advantageous that both $Ar^1$ and $Ar^2$ are p-phenylene groups in view of the production, and it is particularly preferable.

In the formula (2), $Ar^3$ to $Ar^6$ are preferably arylene groups having 6 to 12 carbon atoms, and more preferably arylene groups having 6 to 10 carbon atoms. Specific examples thereof include a m-phenylene group, a p-phenylene group, a dimethyl-p-phenylene group, a tetramethyl-p-phenylene group, a naphthylene group, and a biphenylene group. Both $Ar^3$ to $Ar^6$ are particularly preferably p-phenylene groups. X is a divalent hydrocarbon group having 1 to 15 carbon atoms, and is preferably a group selected from a divalent aliphatic hydrocarbon group, an alicyclic hydrocarbon group, and an aralkylene group, each having 1 to 15 carbon atoms. X is preferably a group selected from a divalent an aliphatic hydrocarbon group, an alicyclic hydrocarbon group, and an aralkylene group, each having 1 to 10 carbon atoms. Specific examples thereof include aliphatic hydrocarbon groups such as a methylene group, a 1,1-ethylene group, a 2,2-propylene group, a 2,2-butylene group, and a 4-methyl-2,2-pentylene group; alicyclic hydrocarbon groups such as a 1,1-cyclohexylene group and a 3,3,5-trimethyl-1,1-cyclohexylene group; and aralkylene groups such as a 1-phenyl-1,1-ethylene group and a diphenylmethylene group. Of these, a 2,2-propylene group is more preferably used. In the formula (2), it is particularly preferred that all $Ar^3$ to $Ar^6$ are p-phenylene groups, and also X is a 2,2-propylene group.

In the formula (3), $Ar^7$ and $Ar^8$ are preferably arylene groups having 6 to 12 carbon atoms, and more preferably arylene groups having 6 to 10 carbon atoms. Specific examples thereof include a m-phenylene group, a p-phenylene group, a dimethyl-p-phenylene group, a tetramethyl-p-phenylene group, a naphthylene group, and a biphenylene group. Of these, p-phenylene group is more preferably used as both $Ar^7$ and $Ar^8$. $Ar^9$ is preferably an arylene group having 6 to 12 carbon atom, and more preferably an arylene group having 6 to 10 carbon atoms. Specific examples thereof include a m-phenylene group, a p-phenylene group, a naphthylene group, and a biphenylene group. Of these, a p-phenylene group or a biphenylene group is more preferable. In the formula (3), $Ar^7$, $Ar^8$ and $Ar^9$ are particularly preferably p-phenylene groups.

The above polyethersulfone can be polymerized by a known method. For example, it can be obtained by polycondensing a monomer having a hydroxyl group and a halogen group at the end in the presence of an alkali metal carbonate in an aprotic polar solvent. For example, it is possible to use, as the polyethersulfone, polyethersulfone commercially available from Solvay Advanced Polymers K.K. under the trademark of "Radel (registered trademark)", polyethersulfone commercially available from BASF Corporation under the trademark of "Ultrason (registered trademark)", and polyethersulfone commercially available from Sumitomo Chemical Co., Ltd. under the trademark of "Sumika Excel (registered trademark)".

A ratio of a PPS resin (a) to a polyetherimide resin or polyethersulfone resin (b) in the thermoplastic resin composition of the present invention is as follows: (a)/(b) is 99 to 1% by weight/1 to 99% by weight, (a)/(b) is preferably 99 to 60% by weight/1 to 40% by weight, (a)/(b) is more preferably 97 to 70% by weight/3 to 30% by weight, and (a)/(b) is particularly preferably 95 to 80% by weight/5 to 20% by weight, based on 100% by weight of the total amount of the component (a) and the component (b). When the amount of the PPS resin (a) is more than 99% by weight, less toughness improving effect is exerted. In contrast, when the amount of the PPS resin (a) is less than 1% by weight, melt fluidity is drastically inhibited and, therefore, it is not preferred.

3. (c) Compound Having Two or More Groups Selected from an Epoxy Group, an Amino Group, an Isocyanate Group, a Hydroxy Group, and an Alkoxysilane Group in a Molecule It is preferred that the thermoplastic resin composition of the present invention further contains a compound (c) having two or more groups selected from an epoxy group, an amino group, an isocyanate group, a hydroxy group, and an alkoxysilane group in a molecule for the purpose of improving compatibility of a PPS resin with a PEI resin or a PES resin.

Examples of the epoxy group-containing compound include glycidyl ethers of bisphenols such as bisphenol A, resorcinol, hydroquinone, pyrocatechol, bisphenol F, saligenin, 1,3,5-trihydroxybenzene, bisphenol S, trihydroxy-diphenyldimethylmethane, 4,4'-dihydroxybiphenyl, 1,5-dihydroxynaphthalene, cashew phenol, and 2,2,5,5,-tetrakis(4-hydroxyphenyl)hexane; those in which halogenated bisphenol is used in place of bisphenol; glycidyl ether-based epoxy compounds such as diglycidyl ether of butanediol; glycidyl ester-based compounds such as phthalic acid glycidyl ester; glycidyl epoxy resins, for example, glycidyl amine-based compounds such as N-glycidylaniline; linear epoxy compounds such as epoxidized polyolefin and epoxidized soybean oil; and cyclic non-glycidyl epoxy resins such as vinylcyclohexene dioxide and dicyclopentadiene dioxide.

Novolak type epoxy resins are also exemplified. The novolak type epoxy resin has two or more epoxy groups and is usually obtained by reacting a novolak type phenol resin with epichlorohydrin. The novolak type phenol resin is obtained by a condensation reaction of phenols with formaldehyde. There is no particular limitation on phenols as raw materials, and examples thereof include phenol, o-cresol, m-cresol, p-cresol, bisphenol A, resorcinol, p-tertiary butylphenol, bisphenol F, bisphenol S, and a condensate thereof.

It is possible to preferably use, as the isocyanate group-containing compound, a diisocyanate compound. It is possible to use, as the diisocyanate, aromatic diisocyanates such as diphenylmethane diisocyanate, tolylene diisocyanate, 1,4-diisocyanatebenzene, xylylene diisocyanate, and 2,6-naphthalene diisocyanate since a resin composition, which has particularly high heat resistance and is less likely to generate a gas, is obtained. It is also possible to use, as the alicyclic diisocyanate, methylenebis(cyclohexylisocyanate), isophorone diisocyanate, methylcyclohexane-2,4-diisocyanate, methylcyclohexane-2,6-diisocyanate, cyclohexane-1,4-diisocyanate, hexahydroxylylene diisocyanate, hexahydrotolylene diisocyanate, and octahydro-1,5-naphthalene diisocyanate.

It is possible to more preferably use, as the component (c), an alkoxysilane compound which has one or more groups selected from an epoxy group, an amino group, an isocyanate group, and a hydroxy group, and one or more alkoxysilane groups. Specific examples of the compound include
γ-glycidoxypropyltrimethoxysilane,
γ-glycidoxypropyltriethoxysilane,
β-(3,4-epoxycyclohexyl)ethyltrimethoxysilane,
γ-(2-aminoethyl)aminopropylmethyldimethoxysilane,
γ-(2-aminoethyl)aminopropyltrimethoxysilane,
γ-aminopropyltrimethoxysilane,
γ-isocyanatepropyltriethoxysilane,
γ-isocyanatepropyltrimethoxysilane,
γ-isocyanatepropylmethyldimethoxysilane,
γ-isocyanatepropylmethyldiethoxysilane,
γ-isocyanatepropylethyldimethoxysilane,
γ-isocyanatepropylethyldiethoxysilane,
γ-isocyanatepropyltrichlorosilane,
γ-hydroxypropyltriethoxysilane, and
γ-hydroxypropyltrimethoxysilane.

Of the above compounds, a compound selected from a compound having two or more epoxy groups, a compound having two or more isocyanate groups, an alkoxysilane having an epoxy group, and an alkoxysilane having an isocyanate group is preferable so as to exhibit stable fine dispersion morphology of a PPS resin with a PEI resin or a PES resin. Use of these two or more compounds in combination is also more preferable mode.

The amount of the component (c) in the present invention is preferably within a range from 0.05 to 10 parts by weight, more preferably from 0.1 to 5 parts by weight, and still more preferably from 0.2 to 3 parts by weight, based on 100 parts by weight of the total amount of the PPS resin (a) and the PEI resin or PES resin (b). When the amount of the component (c) is less than 0.05 part by weight, it may be difficult to judge whether or not the effect is exerted. In contrast, when the amount of the component (c) is more than 10 parts by weight, melt fluidity may deteriorate and it is not preferred in view of economy.

When a compound having an alkoxysilane group is used as the component (c), the alkoxysilane group is hydrolyzed in the presence of water upon melt-kneading or melt molding, and then alkoxysilane groups are condensed by a dealcoholization reaction. When water is added upon melt-kneading or melt molding, the condensation reaction of the alkoxysilane group is accelerated by the addition of water even when using a compound having an alkoxysilane group, which has low molecular weight and high volatility, and thus the volatilization suppressing effect is exerted by an increase in a molecular weight of the compound having an alkoxysilane group. It has been found that the addition of water is also effective for improving compatibility of a PPS resin with a PEI resin or a PES resin. Accordingly, it is possible to preferably add an appropriate amount of water in the present invention.

The addition amount of water is preferably 0.02 part or more, more preferably 0.5 part or more, and still more preferably 1.0 part or more, based on 100 parts by weight of the total amount of the PPS resin (a) and the PEI resin or PES resin (b). There is no particular limitation on the upper limit of the addition amount of water, and the upper limit is preferably less than 5 parts in view of kneadability and an increase in pressure in an extruder due to steam. There is no particular limitation on the method for the addition of water, and it is possible to exemplify a method in which a compound having an alkoxysilane group is simultaneously added as the component (c) upon melt-kneading.

4. Other Components

It is also possible to optionally mix the thermoplastic resin composition of the present invention with (d) an inorganic filler as long as the effects of the present invention are not impaired. Specific examples of the inorganic filler (d) include fibrous fillers such as a glass fiber, a carbon fiber, a carbon nanotube, a carbon nanohorn, a potassium titanate whisker, a zinc oxide whisker, a calcium carbonate whisker, a wollastonite whisker, an aluminum borate whisker, an aramid fiber, an alumina fiber, a silicon carbide fiber, a ceramic fiber, an asbestos fiber, a plaster fiber, and a metal fiber; or fullerene, talc, wollastonite, zeolite, sericite, mica, kaolin, clay, pyrophyllite, silica, bentonite, and asbestos; silicates such as alumina silicate; metal oxides such as silicon oxide, magnesium oxide, alumina, zirconium oxide, titanium oxide, and iron oxide; carbonates such as calcium carbonate, magnesium carbonate, and dolomite; sulfates such as calcium sulfate and barium sulfate; hydroxides such as calcium hydroxide, magnesium hydroxide, and aluminum hydroxide; and non-fibrous fillers such as glass beads, glass flake, glass powder, ceramic beads, boron nitride, silicon carbide, carbon black and silica, and graphite. Of these, a filler selected from glass fiber, silica, and calcium carbonate is preferable, and calcium carbonate or silica is particularly preferable in view of the effect of an anticorrosive and a lubricant. These inorganic fillers (d) may be hollow, and two or more inorganic fillers can be used in combination. These inorganic fillers (d) may be used after subjecting to a pre-treatment with coupling agents such as an isocyanate compound, an organic silane compound, an organotitanate compound, an organoborane compound, and an epoxy compound. Of these, calcium carbonate, silica, and carbon black are preferable in view of the effect of imparting an anticorrosive, a lubricant, and conductivity.

The amount of the inorganic filler is preferably within a range of 30 parts by weight or less, more preferably less than 10 parts by weight, still more preferably less than 1 parts by weight, and yet more preferably 0.8 parts by weight or less, based on 100 parts by weight of the total amount of the polyphenylene sulfide resin (a) and the polyetherimide resin or polyethersulfone resin (b). There is no particular limitation on the lower limit, and the lower limit is preferably 0.01 part by weight or more. While mixing of the inorganic filler is effective for improving an elastic modulus of a material, mixing of a large amount of more than 30 parts by weight of the inorganic filler is not preferable since it may cause drastic deterioration of toughness. It is possible to appropriately vary the content of the inorganic filler depending on applications in view of balance between toughness and rigidity.

It is also possible to mix the thermoplastic resin composition of the present invention with a PPS resin, a PEI resin, and a resin other than a PES resin as long as the effects of the present invention are not impaired. Specific examples thereof include a polyamide resin, a polybutylene terephthalate resin, a polyethylene terephthalate resin, a modified polyphenylene ether resin, a polyethersulfone resin, a polysulfone resin, a polyallylsulfone resin, a polyketone resin, a polyallylate resin, a liquid crystal polymer, a polyether ketone resin, a polythioether ketone resin, a polyether ether ketone resin, a polyimide resin, a polyamideimide resin, and a polyethylene tetrafluoride resin.

For the purpose of improving tensile elongation or impact resistance, mixing of the thermoplastic resin composition with an elastomer component comprising an olefin polymer having a glass transition temperature of room temperature or lower, such as polyethylene is performed. However, in the present invention, it is preferred to avoid the addition of the olefin polymer to the utmost so as to obtain satisfactory heat-resistant creep characteristics and hot water-resistant and pressure-resistant characteristics. Examples of the olefin polymer, which causes deterioration of heat-resistant creep characteristics and hot water-resistant/pressure-resistant characteristics, include a polymer obtained by polymerizing α-olefins such as polyethylene, polypropylene, polybutene-1, polypentene-1,4-methylpentene-1, and isobutylene alone, or two or more olefins; and a copolymer of α-olefin and the other monomer. Examples of the other monomer include α,β-unsaturated acids such as acrylic acid, methyl acrylate, ethyl acrylate, butyl acrylate, methacrylic acid, methylmethacrylate, ethylmethacrylate, and butylmethacrylate, and an alkyl ester thereof; monomers having an acid anhydride group, such as maleic anhydride, itaconic anhydride, citraconic anhydride, endobicyclo-(2,2,1)-5-heptene-2,3-dicarboxylic acid, and endobicyclo-(2,2,1)-5-heptene-2,3-dicarboxylic anhydride; monomers having an epoxy group, such as glycidyl acrylate, glycidyl methacrylate, glycidyl ethacrylate, glycidyl itaconate, and glycidyl citraconate; and monomers containing an ionomer, such as a carboxylic acid metal complex.

It is desired that the thermoplastic resin composition of the present invention does not contain the above olefin elastomer to the utmost. If the thermoplastic resin composition contains the olefin elastomer, the amount is less than 4 parts by weight, preferably 3 parts by weight or less, and more preferably 2 parts by weight or less, based on 100 parts by weight of the total amount of the PPS resin (a) and the PEI resin or PES resin (b).

For the purpose of modifying the thermoplastic resin composition, the following compounds can be added. That is, it is possible to mix with plasticizers such as a polyalkylene oxide oligomer, a thioether compound, an ester compound, and an organophosphorus compound; nucleating agents such as an organophosphorus compound and polyether ether ketone; metal soaps such as montanic acid waxes, lithium stearate, and aluminum stearate; releasants such as an ethylenediamine/stearic acid/sebacic acid polycondensate and a silicone compound; coloring prevention agents such as hypophosphites; and conventional additives such as water, lubricants, ultraviolet inhibitors, colorants, and blowing agents. It is not preferred that the addition amount of all compounds mentioned above is more than 20% by weight based on the entire thermoplastic resin composition since original characteristics of the PPS resin are impaired. The addition amount is more preferably 10% by weight or less, and still more preferably 1% by weight or less.

5. Kneading Method

In the production of a thermoplastic resin composition of the present invention, it is possible to obtain a thermoplastic resin composition, which exhibits excellent toughness even under low temperature environment and is excellent in high-temperature creep characteristics, by melt-kneading the respective components while being allowed to undergo elongational flow. As used herein, elongational flow means a flow method in which a molten resin is drawn in two streams which flows in opposite directions. In contrast, shear flow used in common melt-kneading is a flow method in which a molten resin undergoes deformation in two streams which flows at different speeds in the same direction.

The elongational flow has high dispersion efficiency as compared with the shear flow. Like the PPS resin (a) and the PEI resin or PES resin (b), it is desired that incompatible resins are alloyed and an island component is allowed to undergo highly fine dispersion, it is necessary to accompany any reaction. It has been found in the present invention that it becomes possible to efficiently perform highly fine dispersion by melt-kneading the respective components while being allowed to undergo elongational flow.

It is possible to preferably use, as a specific method in which the respective component are melt-kneaded while being allowed to undergo elongational flow, a melt-kneading method using an extruder provided with a zone in which melt-kneading is performed while being allowed to undergo elongational flow (hereinafter sometimes referred to an elongational flow zone). Examples of the extruder include a single-screw extruder, a twin-screw extruder, and a triple-screw or higher multi-screw extruder. A single-screw extruder and a twin-screw extruder are preferably used, and a twin-screw extruder is particularly preferably used. There is no particular limitation on a screw of the twin-screw extruder, and a fully intermeshing screw, a non-fully intermeshing screw, and a non-intermeshing screw can be used. From the viewpoint of kneadability and reactivity, a fully intermeshing screw is preferable. A rotation direction of the screw may be either the same or different direction, and co-rotating is preferable in view of kneadability and reactivity. In the present invention, the screw is most preferably a co-rotating fully intermeshing screw.

When melt-kneading is performed using an extruder, a flow effect pressure drop before and after the elongational flow zone is preferably from 50 to 1,000 kg/cm$^2$ (4.9 to 98 MPa). The flow effect pressure drop before and after the elongational flow zone is a parameter which indicates the degree of formation of elongational flow. Larger drop in the pressure of a molten resin after the elongational flow zone, as compared with a pressure of a molten resin before the elongational flow zone, means that elongational flow is formed. To the contrary, small pressure drop before and after the elongational flow zone means that elongational flow is scarcely formed. The flow effect pressure drop can be determined by subtracting a pressure value ($P_0$) of a molten resin in the elongational flow zone from a pressure value (P) of a molten resin in front of the elongational flow zone. When the flow effect pressure drop before and after the elongational flow zone is less than 50 kg/cm$^2$ (4.9 MPa), the proportion of formation of the elongational flow in the elongational flow zone is low and also pressure distribution becomes non-uniform and, therefore, it is not preferable. In contrast, when the flow effect pressure drop before and after the elongational flow zone is more than 1,000 kg/cm$^2$ (98.1 MPa), it becomes difficult to stably produce since a back pressure in an extruder excessively increase and, therefore, it is not preferable. The flow effect pressure drop before and after the elongational flow zone is preferably within a range from 70 to 600 kg/cm$^2$ (6.9 to 58.8 MPa), more preferably from 90 to 600 kg/cm$^2$ (8.8 to 58.8 MPa), and most preferably from 100 to 500 kg/cm$^2$ (9.8 to 49.0 MPa).

In the present invention, it is preferred that the elongational flow zone of a twin-screw extruder is disposed over the whole area without being eccentrically located at a specific position in a screw. It is more preferred that the elongational flow zone is disposed at three or more positions in a screw of an extruder in view of kneadability and reactivity.

In the present invention, when melt-kneading is performed using an extruder, a ratio of the total length of the elongational flow zone to the full length of a screw of an extruder is preferably within a range from 5 to 60%, more preferably from 10 to 55%, and still more preferably from 15 to 50%, so as to impart the elongational flow field suited for the present invention. As used herein, the total length of the elongational flow zone means the total length of all elongational flow zones when the extruder includes a plurality of elongational flow zones.

In the present invention, when melt-kneading is performed using an extruder, it is preferred to satisfy the following equation: Lk/D=0.2 to 10, where Lk denotes the length of one elongational flow zone in a screw of an extruder and D denotes a screw diameter, from the viewpoint of kneadability and reactivity. Lk/D is more preferably from 0.3 to 9, and still more preferably from 0.5 to 8.

Figure 2:
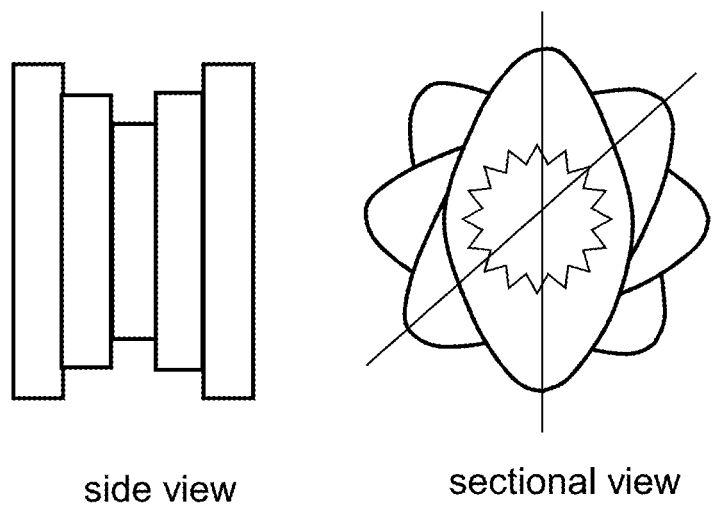
FIG. 2 shows a side view and a sectional view of a common kneading disk used in Comparative Examples.

In the extruder, a specific method for realizing the elongational flow zone includes a method in which a kneading zone comprised of a twist kneading disk as shown in FIG. 1. Unlike a conventional kneading disk shown in FIG. 2, the twist kneading disk is a disk in which a top portion of a kneading disk is oblique to an axis of a screw, and each kneading disk has a twisted spiral shape. An angle, which is formed by a center axis of a screw, and a top portion of a disk tip side of one kneading disk and a top portion of a rear face side thereof, is called a helix angle θ. The helix angle θ preferably falls within a range of 0°<θ<90° in an inverse rotation direction of a screw. Alternatively, it is preferred that a screw is composed of a flight screw and the flight portion of the flight screw is provided with a resin pathway in which a cross-sectional area decreases toward the rear end side from the screw tip side.

When melt-kneading is performed using an extruder, the amount of extrusion of a thermoplastic resin composition is preferably 0.01 kg/hour or more per rpm of a screw. The amount of extrusion means an extrusion speed of a thermoplastic resin composition to be ejected from an extruder, which is a weight (kg) of the thermoplastic resin composition to be ejected from the extruder per hour. When the amount of extrusion of the thermoplastic resin composition per rpm of the screw is less than 0.01 kg/hour, the amount of extrusion to revolution per minute may be insufficient and the retention time in the extruder may become too long, and thus causing heat deterioration. Also, a filling rate of the resin in the extruder may increase, and thus failing to perform sufficient kneading. The amount of extrusion is more preferably 0.1 kg/hour or more, still more preferably 0.15 kg/hour or more, and particularly preferably 0.2 kg/hour or more. There is no particular limitation on a rotational speed of a screw, and the rotational speed is usually 10 rpm or more, preferably 50 rpm or more, and more preferably 80 rpm or more.

When melt-kneading is performed using an extruder, the retention time of a thermoplastic resin composition in an extruder is preferably from 0.1 to 20 minutes. The retention time means the time during which a raw material is ejected through an ejection port of an extruder after supplying to the extruder. The retention time can be measured in the following manner. A colorant is charged, together with the raw material, from the position of a screw root, from which the raw material is supplied. When starting charge of the colorant, a thermoplastic resin composition is extruded through the ejection port of the extruder, and the time, required for the degree of pigmentation of the extrudate by the colorant becomes maximum, is measured and the time is regarded as the retention time. When the retention time is less than 0.1 minute, the reaction may not be sufficiently accelerated because of short reaction time in the extruder, and thus an improvement in characteristics (balance between heat resistance and impact resistance) of the thermoplastic resin composition may be less likely to be realized. In contrast, when the retention time is more than 20 minutes, heat deterioration of the resin may be caused by long retention time. The retention time is more preferably from 0.3 to 15 minutes, and still more preferably from 0.5 to 5 minutes.

The resin temperature upon mixing is preferably within a rage of a fusion peak temperature of a PPS resin (a)+10 to 70° C. The resin temperature upon mixing is more preferably a fusion peak temperature of a PPS resin (a)+10 to 40° C., and particularly preferably a fusion peak temperature of a PPS resin (a)+10 to 30° C. It is preferred to set the temperature of a cylinder proton of an extruder so that the resin temperature falls within the above temperature range, so as to obtain the effects of the present invention.

There is no particular limitation on the mixing order of raw materials. It is possible to use any method, for example, a method in which all raw materials are melt-kneaded by the above method after mixing; a method in which a part of raw materials are melt-kneaded by the above method after mixing, and the obtained kneaded mixture and the remaining raw materials are mixed, followed by melt-kneading; or a method in which a part of raw materials are mixed, and then the mixture is supplied from the position of the screw root of an extruder, followed by melt-kneading and further supplying of the remaining raw materials from the middle position of the extruder using a side feeder, and mixing. It is also possible that other components are pelletized by melt-kneading using the above method, and then a minor adjunct component is mixed with the obtained pellets before molding.

It is also possible to exemplify, as a preferable method, a method in which a PPS resin (a) and a PEI resin or PES resin (b) are once melt-kneaded, followed by melt-kneading one or more times. There is no particular limitation on the upper limit of the kneading time. It is preferred that kneading is performed one to three times after melt-kneading once in view of the toughness improving effect and economy.

It is also possible that a thermoplastic resin composition containing a PEI resin or PES resin (b) in higher concentration than a predetermined concentration is obtained first by melt-kneading, and then the concentration of the PEI resin or PES resin (b) is diluted to a desired concentration by mixing with a PPS resin (a) in the case of melt-kneading one or more times. This case is preferred in view of economy since the kneading amount is smaller than that in the case of kneading all raw materials two or more times. According to this method, it is possible to freely control fluidity of the finally formed thermoplastic resin composition by mixing with PPS resins (a) each having a different melt viscosity, and thus making it possible to easily produce a member for fluid piping, having comparatively complicated shape by injection molding.

6. Characteristics of Thermoplastic Resin Composition

The thermoplastic resin composition of the present invention produced by the above method can reconcile low-temperature toughness and high-temperature creep characteristics.

Low-temperature toughness is evaluated by low-temperature tensile elongation at a temperature of –20° C. That is, it is evaluated by tensile elongation of ASTM No. 4 dumbbell test pieces obtained by molding a thermoplastic resin composition under the conditions of a tension speed of 10 mm/minute and an ambient temperature of –20° C. in accordance with ASTM-D638 using a tensile tester. Detailed measurement conditions will be mentioned below. In the present invention, it is possible to obtain a thermoplastic resin composition in which low-temperature tensile elongation is 15% or more, preferably 20% or more, and more preferably 25% or more. There is no particular limitation on the upper limit of preferable low-temperature tensile elongation, and the upper limit is about 100%.

High-temperature creep characteristics are evaluated as follows. That is, a tensile creep test (100 hours) of ASTM No. 4 dumbbell test pieces obtained by molding a thermoplastic resin composition is performed under the conditions of an ambient temperature of 80° C. and a tensile stress of 20 MPa in accordance with ASTM-D2990, and then evaluation is performed by the value of the amount of tensile creep strain which is obtained by dividing the amount of displacement by a distance between both supporting points. Detailed measurement conditions will be mentioned below. The smaller the amount of tensile creep strain, the more high-temperature creep characteristics are satisfactory. In the present invention, it is possible to obtain a thermoplastic resin composition in which the amount of tensile creep strain is 2.8% or less, preferably 2.5% or less, more preferably 2.0% or less, and particularly 1.5% or less. There is no particular limitation on the lower limit of the amount of tensile creep strain in the present test, and the lower limit is about 1.0%.

7. Applications

The thermoplastic resin composition of the present invention is extremely excellent in toughness and is less likely to generate a gas upon heat-melting, and is also excellent in processability, and is therefore particularly useful for injection molding applications, and extrusion molding applications such as films, sheets, and fibers.

A molded article produced by using the thermoplastic composition of the present invention can be used for various applications. An example of the applications will be mentioned below. For example, the molded article can be applied for various applications, for example, electric equipment parts such as power generator, electric motor, potential transformer, current transformer, voltage regulator, rectifier, inverter, convertor, relay, electric power contact, switch, shut-off, knife switch, multipolar rod, and electric part cabinet; electronic parts such as sensor, LED lamp, connector, socket, resistance, relay case, small switch, coil bobbin, capacitor, variable capacitor case, optical pickup, oscillator, various terminal plates, transformer, plug, printed circuit board, tuner, speaker, microphone, headphone, small motor, magnetic head base, power module, semiconductor, liquid crystal, FDD carriage, FDD chassis, motor brush holder, parabolic antenna, and computer related parts; parts of domestic and office appliances, such as VTR parts, TV parts, iron, hair drier, rice cooker parts, microwave oven parts, sound equipment parts, audio equipment parts such as audio disc, laser disc and compact disc, DVD, lighting fixture parts, refrigerator parts, air conditioner parts, typewriter parts, and word processor parts; machine related parts such as office computer related parts, telephone related parts, facsimile related parts, copier related parts, washing jig, motor parts, lighter, and typewriter; parts of optical equipment and precision machinery, such as microscope, binocular, camera, and clock; and automobile and vehicle parts such as alternator terminal, alternator connector, IC regulator, dimmer potentiometer base, various valves such as exhaust gas valve, fuel-, cooling-, brake-, wiper-, exhaust-, and suction-related various pipes/hoses/tubes, air intake nozzle snorkel, intake manifold, fuel pump, engine cooling water joint, carburetor main body, carburetor spacer, exhaust gas sensor, cooling water sensor, oil temperature sensor, brake pad wear sensor, throttle position sensor, crank shaft position sensor, air flow meter, brake pad abrasion sensor, air conditioner thermostat base, heater's warm air flow control valve, radiator motor brush holder, water pump impeller, turbine vane, wiper motor related parts, distributor, starter switch, starter relay, transmission wire harness, wind washer nozzle, air conditioner panel switch circuit board, fuel related electromagnetic valve coil, fuse connector, horn terminal, electrical equipment parts insulation plate, step motor rotor, lamp socket, lamp reflector, lamp houses, brake piston, solenoid bobbin, engine oil filter, and ignition equipment case.

Particularly, the thermoplastic resin composition of the present invention exhibits excellent toughness even under low-temperature environment and is excellent in high-temperature creep characteristics, and is therefore useful as members for fluid piping, pipings for hot-water heater, and valve members, which are widely applicable regardless of outdoor/indoor installation location.

EXAMPLES

The present invention will be more specifically described below by way of Examples. In the following Examples, material characteristics were determined by the following procedures.
[Weight Average Molecular Weight (Absolute Molecular Weight)]
Using dimethylformamide as a solvent, a weight average molecular weight (absolute molecular weight) was measured by a gel permeation chromatograph (pump: Model 515, manufactured by Waters Corporation, column: TSK-gel-GMH$_{XL}$, manufactured by TOSOH CORPORATION) equipped with a DAWN-DSP type multi-angle laser light scattering photometer (manufactured by Wyatt Technology Corporation).
[Glass Transition Temperature]
Using a differential scanning calorimeter (Model DSC-7, manufactured by Perkin Elmer, Inc.), a glass transition temperature was measured under nitrogen atmosphere at a temperature rise rate of 20° C./min.
[Melt Viscosity]
Using Capilograph (manufactured by Toyo Seiki Co., Ltd., orifice L/D=10 mm/1 mm), a melt viscosity was measured under the conditions of a measurement temperature of 310° C. and a shear speed of 1,000/second.
[Injection Molding]
Using a Sumitomo-Netstal injection molding machine SG75, injection molding of a thermoplastic resin composition to be measured was carried out at a resin temperature of 310° C. and a mold temperature of 130° C. to obtain ASTM No. 4 dumbbell test pieces and a member for fluid piping shown in FIG. 3.
[Measurement of Tensile Elongation]
Using a tensile tester Tensilon UTA2.5T, a tensile test of ASTM No. 4 dumbbell test pieces obtained by injection molding was carried out. The measurement was carried out under the conditions of a tension speed of 10 mm/minute, a grip distance of 64 mm, and an ambient temperature of 23° C. in accordance with ASTM-D638 (2003), and the amount of displacement until fracture occurs was regarded as tensile elongation. An average of values measured five times was regarded as the value of tensile elongation.
[Measurement Low-Temperature Tensile Elongation]
Using a tensile tester Tensilon UTA2.5T, a low-temperature tensile test of ASTM No. 4 dumbbell test pieces obtained by injection molding was carried out. The measurement was carried out under the conditions of a tension speed of 10 mm/minute, a grip distance of 64 mm, and an ambient temperature of −20° C. in accordance with ASTM-D638 (2003), and the amount of displacement until fracture occurs was regarded as tensile elongation. The low-temperature tensile elongation disclosed in Examples is an average of values measured five times.
[Measurement of Tensile Creep Strain]
A tensile creep test of ASTM No. 4 dumbbell test pieces, each having a gate at one side, obtained by injection molding was carried out. The measurement was carried out under the conditions of a grip distance of 65 mm, an ambient temperature of 80° C., and a tensile stress of 20 MPa in accordance with ASTM-D2990 (2003). The value obtained by dividing the amount of displacement, measured after the lapse of 100 hours from the beginning of the test, by a distance between both supporting points was regarded as a tensile creep strain. The tensile creep strain disclosed in Examples is an average of values measured five times.
[Hot Water/Pressure Resistance Test]
In a cylindrical portion of a member for fluid piping obtained by injection molding, shown in FIG. 3, 50% by volume of water was charged. After sealing both ends by a rubber stopper, the periphery was bound by a wire so that the rubber stopper does not come off even when an inner pressure inside a container increases to obtain a measurement sample. The measurement sample was left to stand in a hot air oven heated to 110° C. for 100 hours and then taken out, and it was examined whether or not breakage or cracking of the member for fluid piping occurred. The measurement sample with no breakage or cracking was rated "Good", whereas, the measurement sample with breakage or cracking was rated "Poor". The results are shown in Table 1.

[Freezing/Pressure Resistance Test]

Figure 3:
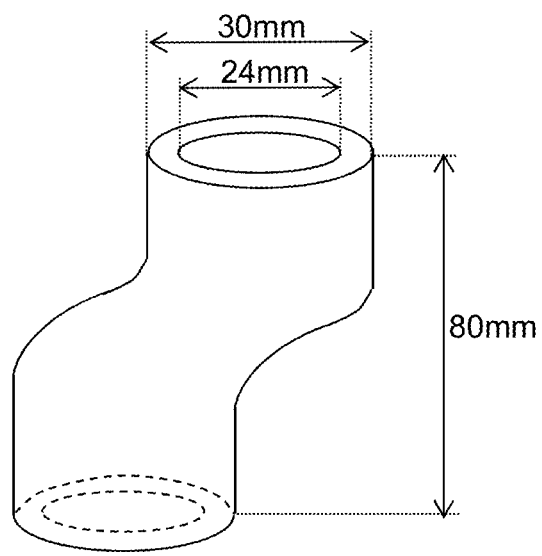
FIG. 3 is a schematic view of a member for fluid piping produced in Examples.

In a cylindrical portion of a member for fluid piping obtained by injection molding, shown in FIG. 3, 95% by volume of water was charged. After sealing both ends by a rubber stopper, the periphery was bound by a wire so that the rubber stopper does not come off even when an inner pressure inside a container increases to obtain a measurement sample. The measurement sample was left to stand in a cooling vessel at −20° C. for 2 hours and then taken out, and it was examined whether or not breakage or cracking of the member for fluid piping occurred. The measurement sample with no breakage or cracking was rated "Good", whereas, the measurement sample with breakage or cracking was rated "Poor". The results are shown in Table 1.

Reference Example 1

(a) Polymerization of PPS Resin (PPS-1)

In a 70 litter autoclave equipped with a stirrer, 8267.37 g (70.00 mol) of 47.5% sodium hydrosulfide, 2957.21 g (70.97 mol) of 96% sodium hydroxide, 11434.50 g (115.50 mol) of N-methyl-2-pyrrolidone (NMP), 2583.00 g (31.50 mol) of sodium acetate, and 10,500 g of ion-exchange water were charged, gradually heated to 245° C. over about 3 hours while passing nitrogen through the autoclave under a normal pressure. After distilling off 14780.1 g of water and 280 g of NMP, the reaction vessel was cooled to 160° C. The amount of moisture remaining in the system was 1.06 mol of alkali metal sulfide, including moisture consumed by hydrolysis of NMP. The amount of scattered hydrogen sulfide was 0.02 mol per mol of the charged alkali metal sulfide.

To the reaction system, 10235.46 g (69.63 mol) of p-dichlorobenzene and 9009.00 g (91.00 mol) of NMP were added and the reaction vessel was sealed under a nitrogen gas, and then the temperature was raised to 238° C. at a rate of 0.6° C./minute while stirring at 240 rpm. After the reaction was performed at 238° C. for 95 minutes, the temperature was raised to 270° C. at a rate of 0.8° C./minute. The reaction was performed at 270° C. for 100 minutes, followed by cooling to 250° C. at a rate of 1.3° C./minute while injecting 1260 g (70 mol) of water under pressure over 15 minutes. After cooling to 200° C. at a rate of 1.0° C./minute, the reaction solution was rapidly cooled to about room temperature.

Contents were taken out, diluted with 26,300 g of NMP, and then the solvent and solid were separated by filtration (80 mesh). The obtained particles were washed with 31,900 g of NMP and then separated by filtration. The obtained particles was repeatedly subjected to washing and separation by filtration several times using 56,000 g of ion-exchange water, followed by washing with 70,000 g of an aqueous 0.05% by weight acetic acid solution and further separation by filtration. Furthermore, the particles were washed with 70,000 g of ion-exchange water and separated by filtration, and then obtained hydrated PPS particles was subjected to hot-air drying at 80° C. and dried at 120° C. under reduced pressure. The obtained PPS resin showed a melt viscosity of 200 Pa·s (at 310° C. and a shear speed of 1,000/second).

Reference Example 2

(a) Polymerization of PPS Resin (PPS-2)

The same operation as in Reference Example 1 was performed, except that the charge amount of sodium acetate was changed to 1639.99 g (20.0 mol). The obtained PPS resin showed a melt viscosity of 130 Pa·s (at 310° C. and a shear speed of 1,000/second).

Reference Example 3

(b-1) PEI Resin

PEI-1: "Ultem (registered trademark)" 1,000 (manufactured by Sabic Innovative Plastics) having a glass transition temperature of 217° C. was used. A weight average molecular weight of the PEI resin-1 was 58,000.
PEI-2: "Ultem (registered trademark)" 1010 (manufactured by Sabic Innovative Plastics) having a glass transition temperature of 217° C. was used. A weight average molecular weight of the PEI resin-2 was 41,000.
PEI-3: "Ultem (registered trademark)" XH6050 (manufactured by Sabic Innovative Plastics) having a glass transition temperature of 247° C. was used. A weight average molecular weight of the PEI resin-3 was 60,000.

Reference Example 4

(b-2) PES Resin

PES-1: "Sumika Excel (registered trademark)" 5003P (manufactured by Sumitomo Chemical Co., Ltd.) having a glass transition temperature of 220° C. was used. A weight average molecular weight of the PES resin-1 was 72,000.

Examples 1 to 10, Examples 14 to 17

As an extruder, a co-rotating fully intermeshing twin-screw extruder (manufactured by The Japan Steel Works, Ltd., TEX-30α) having a screw diameter of 30 mm and L/D (=45) was used. As the screw, two double-thread screws were used. As for screw configuration, elongational flow zones, each having a length of Lk/D (=4.0, 4.0, 5.0) from the position of L/D (=14, 23, 30), were provided from the root of the screw toward the tip. In an elongational flow zone, a twist kneading disk (FIG. 1) was used, a helix angle θ as an angle between the top portion of the kneading disk tip side and the rear face side top portion being adjusted to 20° in an inverse rotation direction of the screw. A ratio of the total length of the elongational flow zone to the screw full length was 29%. The present screw configuration was designated to A-1. According to the formulation shown in Table 1, raw materials were mixed and the obtained mixture was charged in an extruder from the position of the screw root, and then melt-kneading was performed at a cylinder temperature of 300° C., and a screw rotational speed and an extrusion amount shown in Table 1 while performing removal of a volatile component using a vacuum pump and nitrogen flow. The melt-kneaded thermoplastic resin composition was ejected through an ejection port of the extruder, cooled and then pelletized by a strand cutter. A flow effect pressure drop before and after the elongational flow zone was determined by subtracting a pressure value ($P_0$) in the elongational flow zone from a pressure value (P) in front of a twist kneading disk. The results are shown in Table 1. The pellets obtained by drying overnight at 130° C. were subjected to injection molding to obtain the respective molded pieces.

Examples 11 to 13

As for screw configuration, elongational flow zones, each having a length of Lk/D (=4.0, 2.0, 2.0, 1.0) from the position of L/D (=14, 23, 30, 35), were provided from the root of the screw toward the tip. In an elongational flow zone, a twist kneading disk (FIG. 1) was used, a helix angle θ as an angle between the top portion of the kneading disk top side and the rear face side top portion being adjusted to 20° in an inverse rotation direction of the screw. The present screw configuration was designated to A-2. A ratio of the total length of the elongational flow zone to the screw full length was 20%. In the same manner as in Example 1, except for the above conditions, melt-kneading was performed. A flow effect pressure drop before and after the elongational flow zone was determined by subtracting a pressure value ($P_0$) in the elongational flow zone from a pressure value (P) in front of a twist kneading disk. The results are shown in Table 1.

Comparative Examples 1 to 11

As an extruder, a co-rotating fully intermeshing twin-screw extruder (manufactured by The Japan Steel Works, Ltd., TEX-30α) having a screw diameter of 30 mm and L/D (=45) was used. As the screw, two double-thread screws were used. As for screw configuration, a common kneading disk (FIG. 2) of L/D (=4.0, 4.0, 5.0) was provided from the position of L/D (=14, 23, 30) toward tip of the root of the screw. The present screw configuration was designated to B-1. A ratio of the total length of the elongational flow zone to the screw full length was 0%. According to the formulation shown in Table 2, raw materials were mixed and the obtained mixture was charged in an extruder from the position of the screw root, and then melt-kneading was performed at a cylinder temperature of 300° C., a screw rotational speed of 300 rpm, and an extrusion amount of 20 kg/hour while performing removal of a volatile component using a vacuum pump and nitrogen flow. The melt-kneaded thermoplastic resin composition was ejected through an ejection port of the extruder, cooled and then pelletized by a strand cutter. A flow effect pressure drop before and after the elongational flow zone was determined by subtracting a pressure value ($P_0$) in the elongational flow zone from a pressure value (P) in front of a twist kneading disk. As a result, the low effect pressure drop was less than 5 kg/cm² in any Comparative Example. The pellets obtained by drying overnight at 130° C. were subjected to injection molding to obtain the respective molded pieces.

TABLE 1

|  |  |  | Example 1 | Example 2 | Example 3 | Example 4 | Example 5 | Example 6 | Example 7 | Example 8 |
|---|---|---|---|---|---|---|---|---|---|---|
| Component (a) | Type | — | PPS-1 | PPS-1 | PPS-1 | PPS-1 | PPS-2 | PPS-1 | PPS-1 | PPS-1 |
|  | Amount | % by weight | 90 | 70 | 30 | 10 | 90 | 90 | 90 | 90 |
| Component (b) | Type | — | PEI-1 | PEI-1 | PEI-1 | PEI-1 | PEI-1 | PEI-1 | PEI-2 | PEI-3 |
|  | Amount | % by weight | 10 | 30 | 70 | 90 | 10 | 10 | 10 | 10 |
| Component (c) | Type | — | — | — | — | — | — | C-1 | C-1 | C-2 |
|  | Amount | Parts by weight[*) | — | 0 | — | — | — | 0.5 | 0.5 | 0.5 |
| Other additives | Type | — | — | — | — | — | — | — | — | — |
|  | Amount | Parts by weight[*) | — | — | — | — | — | — | — | — |
| Melt-kneading conditions | Screw configuration | — | A-1 | A-1 | A-1 | A-1 | A-1 | A-1 | A-1 | A-1 |
|  | Flow effect pressure drop | kg/cm² | 100 | 120 | 120 | 120 | 95 | 110 | 105 | 120 |
|  | Proportion of elongational flow zone | % | 29 | 29 | 29 | 29 | 29 | 29 | 29 | 29 |
| Tensile elongation |  | % | 145 | 100 | 95 | 90 | 104 | 160 | 150 | 160 |
| Low-temperature tensile elongation (−20° C.) |  | % | 20 | 18 | 17 | 18 | 16 | 45 | 40 | 40 |
| Tensile creep strain (80° C.) |  | % | 2.6 | 2.4 | 2.3 | 2.2 | 2.7 | 1.7 | 2.0 | 1.5 |
| Freezing/Pressure resistance test |  | — | Good | Good | Good | Good | Good | Good | Good | Good |
| Hot water/Pressure resistance test |  | — | Good | Good | Good | Good | Good | Good | Good | Good |

[*)Amount based on 100 parts by weight of PPS + PEI or PPS + PES
C-1: 3-isocyanatopropyltriethoxysilane (KBE9007, manufactured by Shin-Etsu Silicones)
C-2: γ-aminopropyltriethoxysilane (KBE903, manufactured by Shin-Etsu Silicones)
C-3: 2-(3,4-epoxycyclohexyl)ethyltrimethoxysilane (KBM303, manufactured by Shin-Etsu Silicones)
E-1: Ethylene-glycidylmethacrylatecopolymer (BF-7, manufactured by Sumitomo Chemical Co., Ltd.) and ethylene-butene-1copolymer 50/50 wt % mixture of (TAFMER TX610, manufactured by Mitsui Chemicals, Inc.)

TABLE 2

|  |  |  | Example 9 | Example 10 | Example 11 | Example 12 | Example 13 | Example 14 | Example 15 | Example 16 | Example 17 |
|---|---|---|---|---|---|---|---|---|---|---|---|
| Component (a) | Type | — | PPS-1 | PPS-1 | PPS-1 | PPS-1 | PPS-1 | PPS-1 | PPS-1 | PPS-1 | PPS-1 |
|  | Amount | % by weight | 10 | 90 | 90 | 90 | 90 | 90 | 70 | 30 | 90 |
| Component (b) | Type | — | PEI-2 | PEI-1 | PEI-1 | PEI-1 | PEI-1 | PES-1 | PES-1 | PES-1 | PES-1 |
|  | Amount | % by weight | 90 | 10 | 10 | 10 | 10 | 10 | 30 | 70 | 10 |
| Component (c) | Type | — | C-1 | C-2 | C-1 | C-2 | C-1 | — | — | — | C-1 |
|  | Amount | Parts by weight[*) | 0.5 | 0.5 | 0.5 | 0.5 | 0.5 | — | — | — | 0.5 |

TABLE 2-continued

|  |  |  | Example 9 | Example 10 | Example 11 | Example 12 | Example 13 | Example 14 | Example 15 | Example 16 | Example 17 |
|---|---|---|---|---|---|---|---|---|---|---|---|
| Other additives | Type | — | — | — | — | — | E-1 | — | — | — | — |
|  | Amount | Parts by weight*) | — | — | — | — | 2 | — | — | — | — |
| Melt-kneading conditions | Screw configuration | — | A-1 | A-1 | A-2 | A-2 | A-2 | A-1 | A-1 | A-1 | A-1 |
|  | Flow effect pressure drop | kg/cm² | 125 | 105 | 95 | 90 | 90 | 100 | 120 | 120 | 110 |
|  | Proportion of elongational flow zone | % | 29 | 29 | 20 | 20 | 20 | 29 | 29 | 29 | 29 |
| Tensile elongation |  | % | 100 | 150 | 140 | 130 | 135 | 85 | 90 | 95 | 110 |
| Low-temperature tensile elongation (−20° C.) |  | % | 22 | 35 | 30 | 25 | 27 | 18 | 16 | 15 | 40 |
| Tensile creep strain (80° C.) |  | % | 2.0 | 2.2 | 2.2 | 2.3 | 2.3 | 2.7 | 2.5 | 2.4 | 1.9 |
| Freezing/Pressure resistance test |  | — | Good | Good | Good | Good | Good | Good | Good | Good | Good |
| Hot water/Pressure resistance test |  | — | Good | Good | Good | Good | Good | Good | Good | Good | Good |

*)Amount based on 100 parts by weight of PPS + PEI or PPS + PES
C-1: 3-isocyanatopropyltriethoxysilane (KBE9007, manufactured by Shin-Etsu Silicones)
C-2: γ-aminopropyltriethoxysilane (KBE903, manufactured by Shin-Etsu Silicones)
C-3: 2-(3,4-epoxycyclohexyl) ethyltrimethoxysilane (KBM303, manufactured by Shin-Etsu Silicones)
E-1: Ethylene-glycidylmethacrylatecopolymer (BF-7, manufactured by Sumitomo Chemical Co., Ltd.) and ethylene-butene-1copolymer 50/50 wt % mixture of (TAFMER TX610, manufactured by Mitsui Chemicals, Inc.)

TABLE 3

|  |  |  | Comparative Example 1 | Comparative Example 2 | Comparative Example 4 | Comparative Example 5 | Comparative Example 6 |
|---|---|---|---|---|---|---|---|
| Component (a) | Type | — | PPS-1 | PPS-1 | PPS-1 | PPS-1 | PPS-1 |
|  | Amount | % by weight | 90 | 70 | 90 | 10 | 90 |
| Component (b) | Type | — | PEI-1 | PEI-1 | PEI-1 | PEI-1 | PEI-1 |
|  | Amount | % by weight | 10 | 30 | 10 | 90 | 10 |
| Component (c) | Type | — | — | — | C-1 | C-1 | C-2 |
|  | Amount | Parts by weight*) | — | — | 0.5 | 0.5 | 0.5 |
| Other additives | Type | — | — | — | — | — | — |
|  | Amount | Parts by weight*) | — | — | — | — | — |
| Melt-kneading conditions | Screw configuration | — | B-1 | B-1 | B-1 | B-1 | B-1 |
|  | Flow effect pressure drop | kg/cm² | <5 | <5 | <5 | <5 | <5 |
|  | Proportion of elongational flow zone | % | 0 | 0 | 0 | 0 | 0 |
| Tensile elongation |  | % | 25 | 20 | 165 | 80 | 80 |
| Low-temperature tensile elongation (−20° C.) |  | % | 4 | 3 | 12 | 13 | 11 |
| Tensile creep strain (80° C.) |  | % | 3.5 | 3.2 | 3.1 | 2.8 | 2.2 |
| Freezing/Pressure resistance test |  | — | Poor | Poor | Poor | Poor | Poor |
| Hot water/Pressure resistance test |  | — | Poor | Poor | Poor | Good | Poor |

|  |  |  | Comparative Example 7 | Comparative Example 8 | Comparative Example 9 | Comparative Example 10 | Comparative Example 11 |
|---|---|---|---|---|---|---|---|
| Component (a) | Type | — | PPS-1 | PPS-1 | PPS-1 | PPS-1 | PPS-1 |
|  | Amount | % by weight | 90 | 95 | 90 | 90 | 90 |
| Component (b) | Type | — | PEI-2 | PEI-2 | PEI-2 | PES-1 | PES-1 |
|  | Amount | % by weight | 10 | 5 | 10 | 10 | 10 |
| Component (c) | Type | — | C-1 | C-3 | C-3 | — | C-1 |
|  | Amount | Parts by weight*) | 0.5 | 1.0 | 1.0 | — | 0.5 |
| Other additives | Type | — | E-1 | E-1 | E-1 | — | — |
|  | Amount | Parts by weight*) | 5 | 5 | 5 | — | — |
| Melt-kneading conditions | Screw configuration | — | B-1 | B-1 | B-1 | B-1 | B-1 |
|  | Flow effect pressure drop | kg/cm² | <5 | <5 | <5 | <5 | <5 |
|  | Proportion of elongational flow zone | % | 0 | 0 | 0 | 0 | 0 |
| Tensile elongation |  | % | 97 | 85 | 90 | 20 | 130 |
| Low-temperature tensile elongation (−20° C.) |  | % | 13 | 13 | 12 | 4 | 12 |
| Tensile creep strain (80° C.) |  | % | 3.0 | 3.0 | 3.1 | 3.5 | 3.1 |

TABLE 3-continued

| | | | | | | |
|---|---|---|---|---|---|---|
| Freezing/Pressure resistance test | — | Poor | Poor | Poor | Poor | Poor |
| Hot water/Pressure resistance test | — | Poor | Poor | Poor | Poor | Poor |

*)Amount based on 100 parts by weight of PPS + PEI or PPS +PES
C-1: 3-isocyanatopropyltriethoxysilane (KBE9007, manufactured by Shin-Etsu Silicones)
C-2: γ-aminopropyltriethoxysilane (KBE903, manufactured by Shin-Etsu Silicones)
C-3: 2-(3,4-epoxycyclohexyl) ethyltrimethoxysilane (KBM303, manufactured by Shin-Etsu Silicones)
E-1: Ethylene-glycidyl methacrylate copolymer (BF-7, manufactured by Sumitomo Chemical Co., Ltd.) and ethylene-butene-1copolymer 50/50 wt % mixture of (TAFMER TX610, manufactured by Mitsui Chemicals, Inc.)

As is apparent from Examples 1 to 13 and Comparative Examples 1 to 9, the thermoplastic resin compositions containing a PPS resin and a PEI resin as main components, produced by a specific melt-kneading method of the present invention, exhibit excellent low-temperature toughness at −20° C. and also exhibits high resistance in high-temperature tensile creep characteristics at 80° C., as compared with the thermoplastic resin compositions produced by a conventional melt-kneading method. It is also apparent that members for fluid piping composed of the thermoplastic resin composition of the present invention exhibit remarkably satisfactory results in a hot water/pressure resistance test. That is, it has been found that it is necessary to perform melt-kneading while being allowed to undergo elongational flow so as to exhibit the effects of the present invention.

As is also apparent from a comparison between Example 1 and 5, and Examples 6 and 7, the use of a PPS resin and a PEI resin, which have a specific melt viscosity or molecular weight, is advantageous so as to reconcile higher low-temperature toughness and high-temperature creep characteristics.

As is also apparent from Examples 14 to 17 and Comparative Examples 10 to 11, even when a PES resin is used in place of a PEI resin, excellent low-temperature toughness and high-temperature creep characteristics are exhibited.

[Observation of Morphology]

Figure 4:
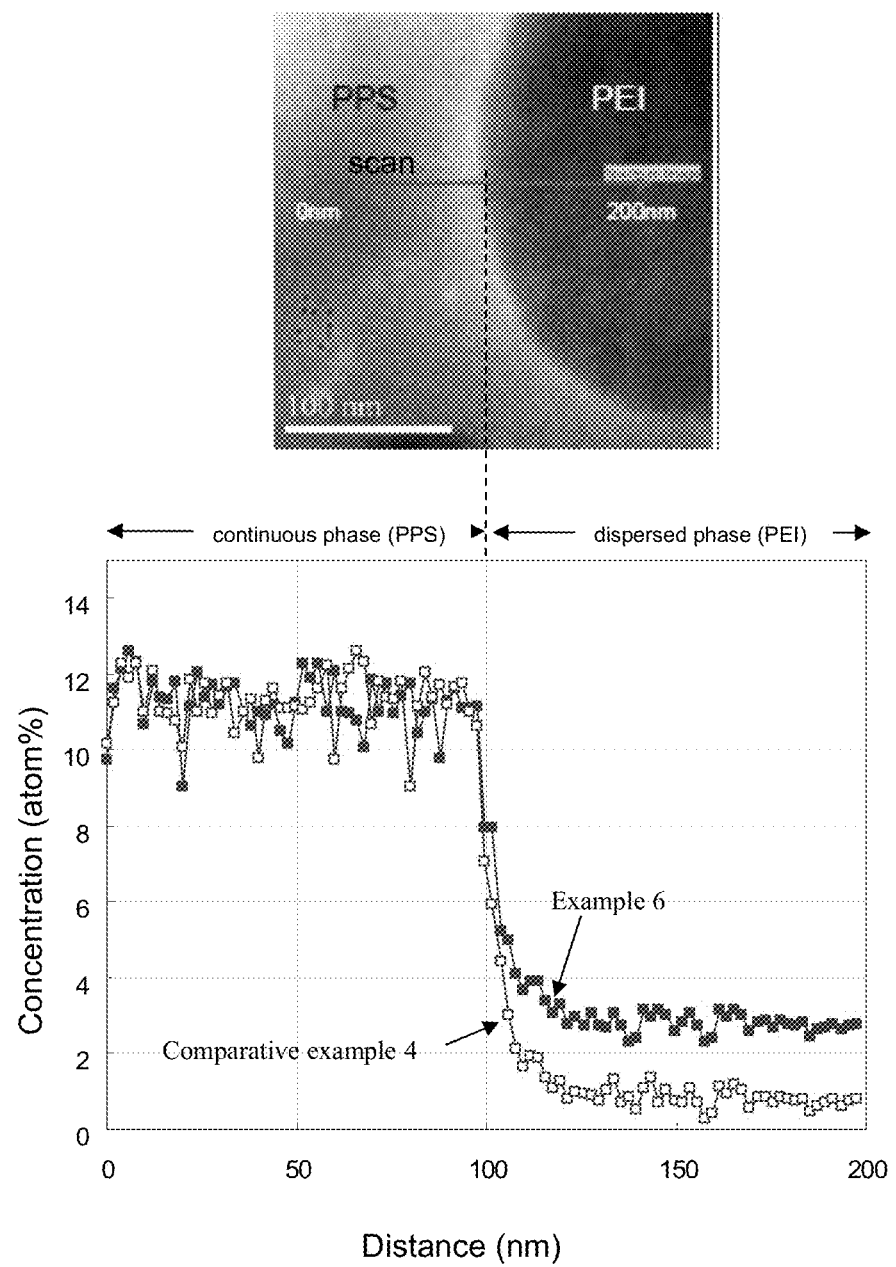
FIG. 4 is a graph showing the measurement results which are obtained by measuring sulfur atom detection intensity of injection molding test pieces obtained in Example 6 and Comparative Example 4 using a field-emission electronmicroscope.

Each of the injection molding test pieces obtained in Example 6 and Comparative Example 4 was cut at the center portion in a direction perpendicular to a resin flow direction, and then a slice measuring 0.1 μm or less was cut from the center portion of the cross section at −20° C. The obtained slice was observed at a magnification of 10,000 times by a field-emission electron microscope (HRTEM JEM2100F, manufactured by JEOL, Ltd.) equipped with an energy-dispersive X-ray spectrometer (EDX JED-2300T, manufactured by JEOL, Ltd.). The obtained electron micrograph is shown in the upper portion of FIG. 4. The portion of a distance of 200 nm with an interface portion of a continuous phase (PPS resin) and a dispersed phase (PEI resin) as the center was scanned at intervals of 2 nm, and then a sulfur atom detection intensity at each portion was measured. A graph with an ordinate comprising a sulfur atom detection intensity is shown in the lower portion of FIG. 4. In the thermoplastic resin composition of Comparative Example 4 produced by a conventional melt-kneading method, sulfur atoms derived from the PPS resin are scarcely observed in the dispersed phase (PEI resin). In contrast, in the thermoplastic resin composition of Example 6 produced by a specific melt-kneading method of the present invention, sulfur atoms derived from the PPS resin are also observed, comparatively strongly, in a PEI resin phase as the dispersed phase. These results reveal that, although the PPS resin is essentially incompatible with the PEI resin, specific morphology including a high concentration the PPS resin existing therein is also formed in the PEI resin phase in the thermoplastic resin composition produced by a specific melt-kneading method of the present invention. Such specific morphology would be a factor capable of reconciling opposing characteristics, i.e. excellent flexibility which enables large tensile elongation even at low temperature of −20° C., and high rigidity which is less likely to cause creep deformation even at high temperature of 80° C.

REFERENCE SIGNS LIST

1: Top portion of disk front face portion
2: Top portion of disk rear face side
3: Rotation direction of screw

INDUSTRIAL APPLICABILITY

According to the present invention, it is possible to obtain a thermoplastic resin composition which is extremely excellent in toughness represented by tensile elongation and exhibits sufficient toughness, even in particularly low temperature range, and is also excellent in high-temperature creep characteristics as an indicator of heat-resistant durability.

A molded article comprising the thermoplastic resin composition of the present invention is suited for use as a member for fluid piping. Particularly, the molded article is useful as a member in which an applicable temperature range is widened regardless of outdoor/indoor installation location.

The invention claimed is:

1. A thermoplastic resin composition comprising:
   (a) a polyphenylene sulfide resin, and
   (b) a polyetherimide resin or a polyethersulfone resin,
   wherein the thermoplastic resin composition contains 99 to 1% by weight of the component (a) and 1 to 99% by weight of the component (b) based on 100% by weight of the total amount of the component (a) and the component (b), and also satisfies the following conditions:
   (i) a tensile elongation of 15% or more, wherein the tensile elongation is measured in accordance with ASTM-D638 under the conditions of a tension speed of 10 mm/minute and an ambient temperature of −20° C. using ASTM No. 4 dumbbell test pieces; and
   (ii) a tensile creep strain of 2.8% or less, wherein the tensile creep strain is measured after the lapse of 100 hours from the beginning of a tensile creep test performed in accordance with ASTM-D2990 under the conditions of an ambient temperature of 80° C. and a tensile stress of 20 MPa using ASTM No. 4 dumbbell test pieces.

2. The thermoplastic resin composition according to claim 1, which contains:
   99 to 60% by weight of the polyphenylene sulfide resin (a), and
   1 to 40% by weight of the polyetherimide resin or polyethersulfone resin (b).

3. The thermoplastic resin composition according to claim 1, which further contains:
(c) a compound having, in a molecule, two or more groups selected from an epoxy group, an amino group, an isocyanate group, a hydroxy group, and an alkoxysilane group, wherein the amount of the component (c) is from 0.05 to 10 parts by weight based on 100 parts by weight of the total amount of the component (a) and the component (b).

4. The thermoplastic resin composition according to claim 3, wherein the component (c) is an alkoxysilane compound having one or more groups selected from an epoxy group, an amino group, an isocyanate group, and a hydroxy group, and one or more alkoxysilane groups.

5. The thermoplastic resin composition according to claim 1, wherein a melt viscosity of the polyphenylene sulfide resin (a) is 150 Pa·s or more under the conditions of 310° C. and a shear speed of 1,000/second.

6. The thermoplastic resin composition according to claim 1, wherein a weight average molecular weight of the polyetherimide resin (b) is from 50,000 to 100,000.

7. A molded article comprising the thermoplastic resin composition according to claim 1.

8. The molded article according to claim 7, which is a member for fluid piping.

9. The thermoplastic resin composition according to claim 1, wherein the composition is produced by a method including a melt-kneading step conducted by employing an extruder provided with an elongational flow zone which is a zone in which melt-kneading of the molten resin is performed while the molten resin is allowed to undergo elongational flow, wherein a flow effect pressure drop is from 50 to 1,000 kg/cm$^2$, the flow effect pressure drop being determined by subtracting the pressure value ($P_0$) of the molten resin in the elongational flow zone from the pressure value (P) of the molten resin before entering the elongational flow zone.

* * * * *